United States Patent
Nakagawa et al.

(10) Patent No.: US 12,387,748 B2
(45) Date of Patent: Aug. 12, 2025

(54) MAGNETIC HEAD WITH MULTILAYER CONFIGURATION BETWEEN MAGNETIC POLES AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki Kanagawa (JP); Naoyuki Narita, Funabashi Chiba (JP); Tomoyuki Maeda, Kawasaki Kanagawa (JP); Masayuki Takagishi, Tokyo (JP); Tazumi Nagasawa, Yokohama Kanagawa (JP); Ryo Osamura, Kawasaki Kanagawa (JP); Kosuke Kurihara, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 20 days.

(21) Appl. No.: 18/358,677

(22) Filed: Jul. 25, 2023

(65) Prior Publication Data

US 2024/0135962 A1  Apr. 25, 2024
US 2024/0233755 A9  Jul. 11, 2024

(30) Foreign Application Priority Data

Oct. 20, 2022 (JP) .................... 2022-168539

(51) Int. Cl.
*G11B 5/235* (2006.01)
*G11B 5/127* (2006.01)
(Continued)

(52) U.S. Cl.
CPC ............ *G11B 5/235* (2013.01); *G11B 5/1278* (2013.01); *G11B 5/3116* (2013.01); *G11B 5/314* (2013.01);
(Continued)

(58) Field of Classification Search
None
See application file for complete search history.

(56) References Cited

U.S. PATENT DOCUMENTS 7,616,412 B2    11/2009    Zhu et al.
9,007,721 B2    4/2015    Sato et al.
(Continued)

FOREIGN PATENT DOCUMENTS

JP    2008-277586 A    11/2008
JP    2009-064499 A    3/2009
(Continued)

OTHER PUBLICATIONS

Office Action of corresponding U.S. Appl. No. 18/358,872 issued on Jun. 18, 2024, 17 pages.
(Continued)

*Primary Examiner* — Craig A. Renner
(74) *Attorney, Agent, or Firm* — Knobbe, Martens, Olson & Bear, LLP

(57) ABSTRACT

According to one embodiment, a magnetic head includes first and second magnetic poles, a conductive part, an element part, and first to fourth terminals. The conductive part is electrically insulated from the first and second magnetic poles. The first and second terminals are electrically connected to the conductive part. The element part is provided between the first and second magnetic poles and electrically connected to the first and second magnetic poles. The element part is conductive. The third terminal is electrically connected to the first magnetic pole. The fourth
(Continued)

terminal is electrically connected to the second magnetic pole. A first magnetic pole temperature in a first state is higher than a second magnetic pole temperature of the second magnetic pole in the first state. A first current is supplied between the first and second terminals in the first state.

21 Claims, 15 Drawing Sheets

(51) Int. Cl.
*G11B 5/31* (2006.01)
*G11B 5/00* (2006.01)

(52) U.S. Cl.
CPC ............ *G11B 5/3146* (2013.01); *G11B 5/315* (2013.01); *G11B 2005/0024* (2013.01)

(56) References Cited

U.S. PATENT DOCUMENTS

| | | | |
|---|---|---|---|
| 9,064,508 B1 | 6/2015 | Shiimoto et al. | |
| 9,117,474 B1 | 8/2015 | Contreras et al. | |
| 10,325,618 B1* | 6/2019 | Wu et al. | G11B 5/1278 |
| 10,522,174 B1 | 12/2019 | Chen et al. | |
| 10,714,129 B1* | 7/2020 | Tang et al. | G11B 5/3146 |
| 10,937,450 B1 | 3/2021 | Kawasaki et al. | |
| 11,393,493 B1 | 7/2022 | Nakagawa et al. | |
| 11,398,244 B2 | 7/2022 | Takagishi et al. | |
| 11,568,891 B1 | 1/2023 | Chen et al. | |
| 2005/0053805 A1 | 3/2005 | Hinoue et al. | |
| 2006/0051620 A1 | 3/2006 | Hinoue et al. | |
| 2006/0057429 A1 | 3/2006 | Hinoue et al. | |
| 2006/0292401 A1 | 12/2006 | Suzuki et al. | |
| 2008/0019040 A1 | 1/2008 | Zhu et al. | |
| 2008/0268291 A1 | 10/2008 | Akiyama et al. | |
| 2009/0052095 A1 | 2/2009 | Yamada et al. | |
| 2009/0059417 A1 | 3/2009 | Takeo et al. | |
| 2009/0197120 A1 | 8/2009 | Taguchi et al. | |
| 2009/0258253 A1 | 10/2009 | Hinoue et al. | |
| 2012/0126905 A1 | 5/2012 | Zhang et al. | |
| 2012/0164487 A1 | 6/2012 | Childress et al. | |
| 2012/0176702 A1 | 7/2012 | Yamada et al. | |
| 2013/0050869 A1 | 2/2013 | Nagasaka et al. | |
| 2015/0043106 A1* | 2/2015 | Yamada et al. | G11B 5/1278 360/123.05 |
| 2016/0027455 A1* | 1/2016 | Kudo et al. | G11B 5/235 360/125.03 |
| 2019/0088275 A1 | 3/2019 | Narita et al. | |
| 2020/0090685 A1* | 3/2020 | Takagishi et al. | G11B 5/3146 |
| 2020/0294537 A1 | 9/2020 | Nagasawa et al. | |
| 2020/0381012 A1* | 12/2020 | Chembrolu et al. | G11B 5/1278 |
| 2020/0402532 A1* | 12/2020 | Asif Bashir et al. | G11B 5/314 |
| 2021/0125631 A1* | 4/2021 | Bai et al. | G11B 5/1278 |
| 2021/0142821 A1 | 5/2021 | Iwasaki et al. | |
| 2021/0375309 A1 | 12/2021 | Iwasaki et al. | |
| 2022/0005497 A1 | 1/2022 | Takagishi et al. | |
| 2022/0084551 A1 | 3/2022 | Koizumi | |
| 2022/0157335 A1 | 5/2022 | Iwasaki et al. | |
| 2022/0270640 A1 | 8/2022 | Nakagawa et al. | |
| 2022/0270641 A1 | 8/2022 | Nakagawa et al. | |
| 2022/0399035 A1 | 12/2022 | Goncharov et al. | |
| 2023/0031273 A1 | 2/2023 | Nakagawa et al. | |
| 2023/0046928 A1 | 2/2023 | Nakagawa et al. | |
| 2023/0178102 A1 | 6/2023 | Nakagawa et al. | |
| 2023/0386510 A1 | 11/2023 | Nakagawa et al. | |
| 2024/0029759 A1 | 1/2024 | Chen et al. | |
| 2024/0144961 A1 | 5/2024 | Asif Bashir et al. | |
| 2024/0144962 A1 | 5/2024 | Asif Bashir et al. | |
| 2024/0144963 A1 | 5/2024 | Asif Bashir et al. | |
| 2024/0296861 A1 | 9/2024 | Nakagawa et al. | |
| 2024/0296862 A1 | 9/2024 | Nakagawa et al. | |
| 2024/0296863 A1 | 9/2024 | Nakagawa et al. | |
| 2024/0296864 A1 | 9/2024 | Nakagawa et al. | |
| 2024/0296865 A1 | 9/2024 | Nakagawa et al. | |

FOREIGN PATENT DOCUMENTS

| | | |
|---|---|---|
| JP | 4358279 B2 | 11/2009 |
| JP | 2012-146351 A | 8/2012 |
| JP | 2019-057338 A | 4/2019 |
| JP | 2022-012263 A | 1/2022 |
| JP | 2022-050037 A | 3/2022 |
| JP | 2022-129730 A | 9/2022 |
| JP | 2023-083663 A | 6/2023 |

OTHER PUBLICATIONS

X. Bai and J.-G. Zhu, "Effective Field Analysis of Segmented Media for Microwave-Assisted Magnetic Recording", in IEEE Magnetics Letters, vol. 8, pp. 1-4, 2017.

T. Tanaka, et al., "MAMR writability and signal-recording characteristics on granular exchange-coupled composite media" in Journal of Magnetism and Magnetic Materials 529 (2021).

Final Office Action of corresponding U.S. Appl. No. 18/363,613 issued on Apr. 22, 2024 in 9 pages.

Office Action received in U.S. Appl. No. 18/363,423 dated Nov. 14, 2024 in 26 pages.

Office Action issued in U.S. Appl. No. 18/363,624, dated Sep. 19, 2024 in 18 pages.

Office Action issued in U.S. Appl. No. 18/363,573, dated Oct. 8, 2024 in 24 pages.

* cited by examiner

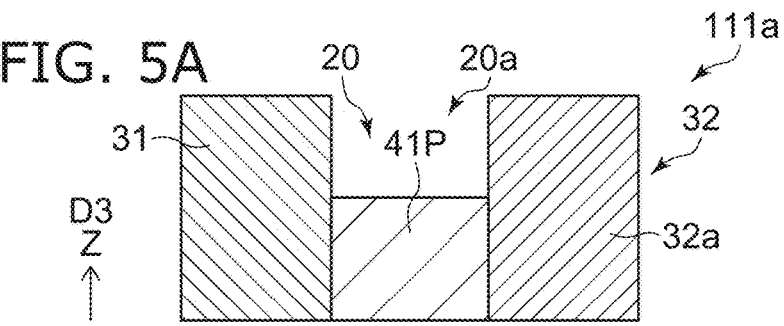
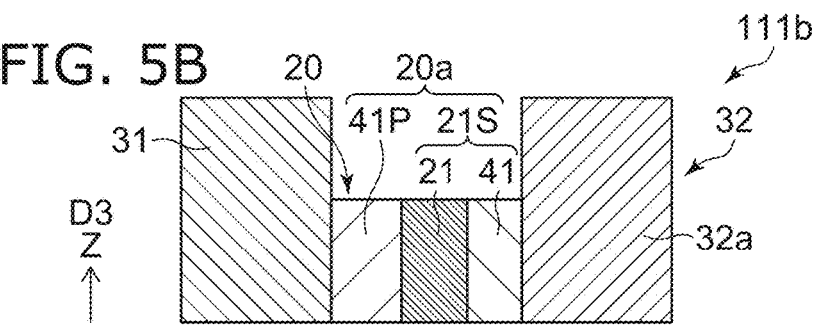
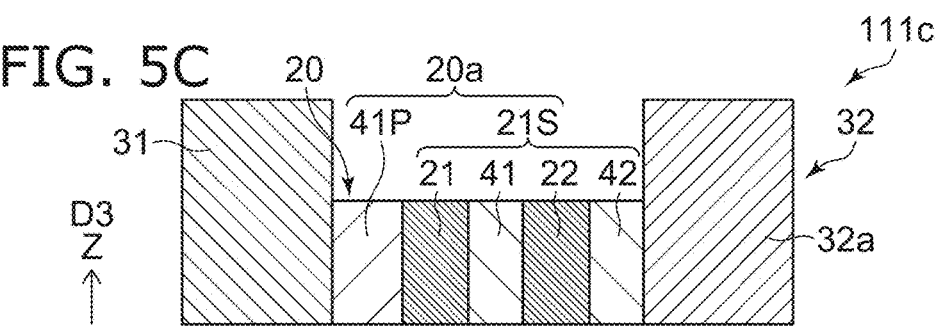
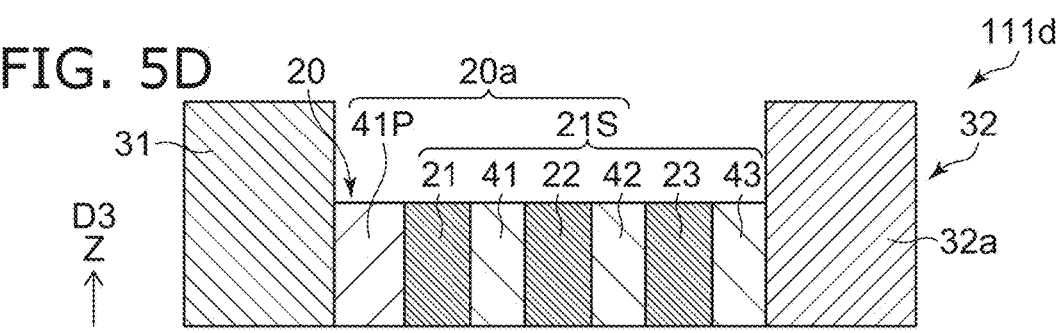
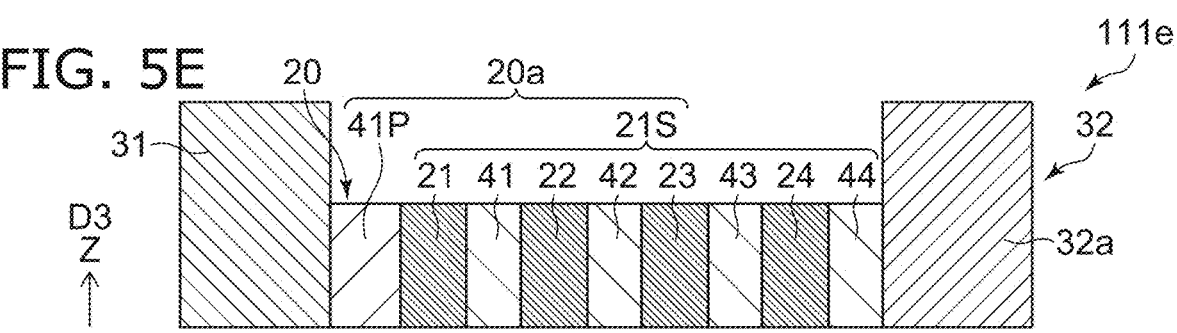

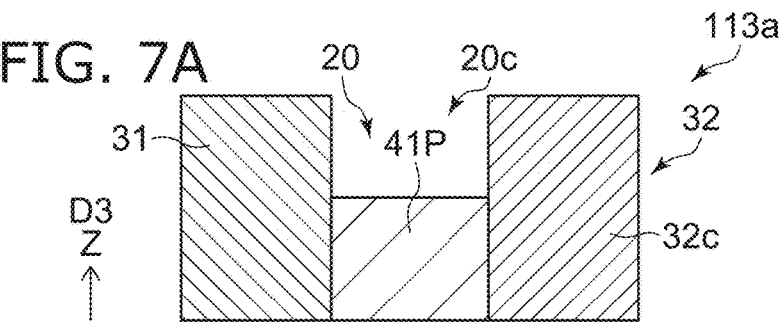
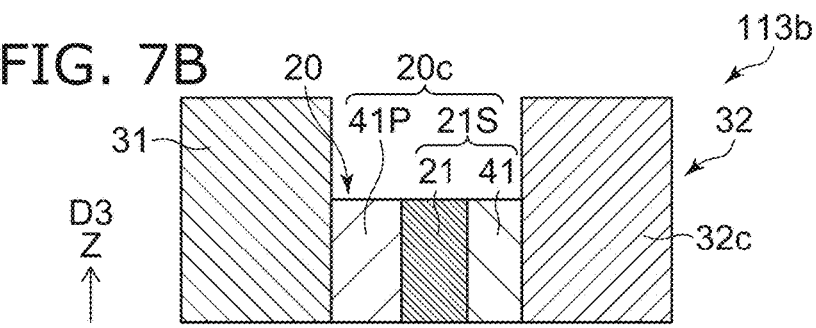
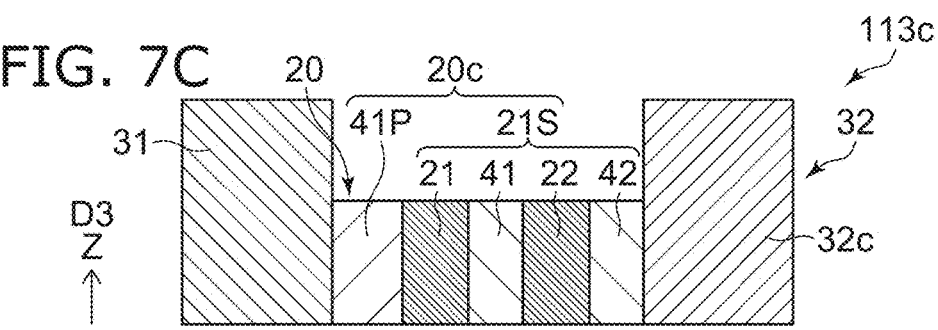
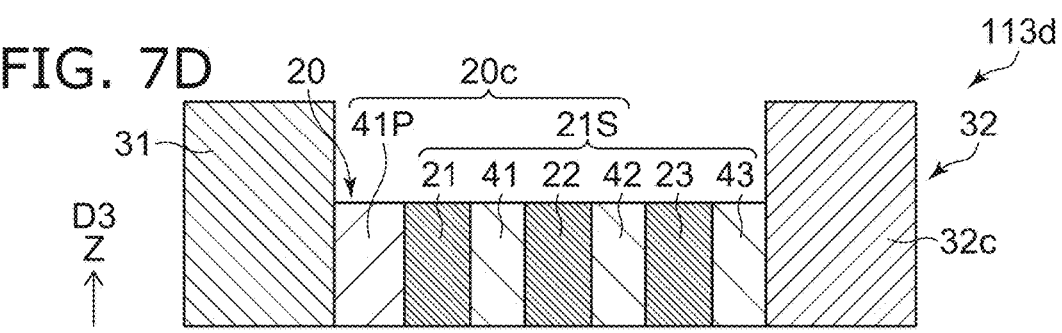
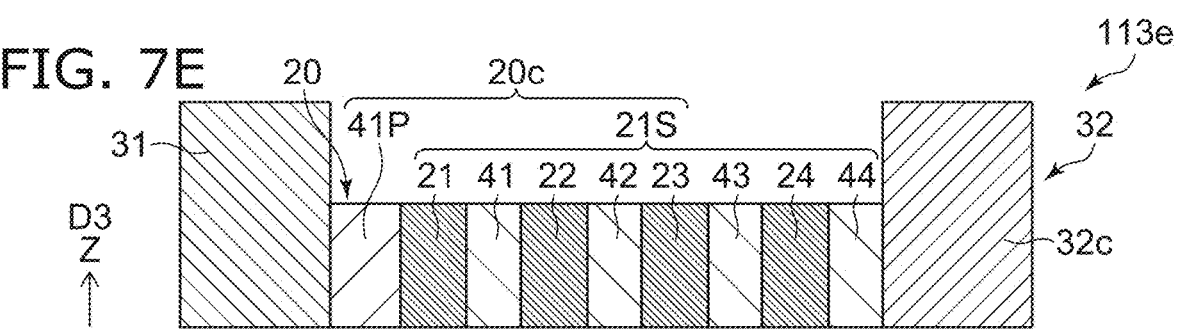

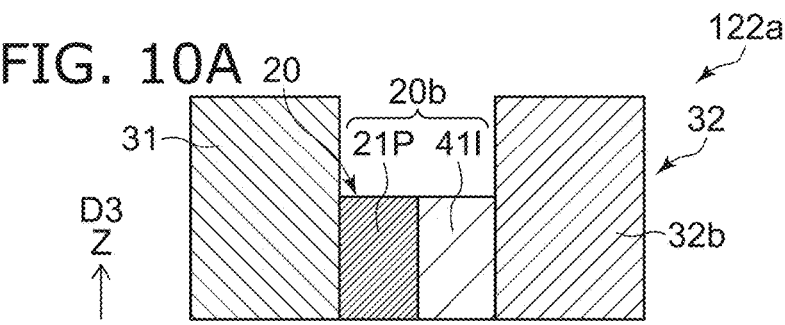
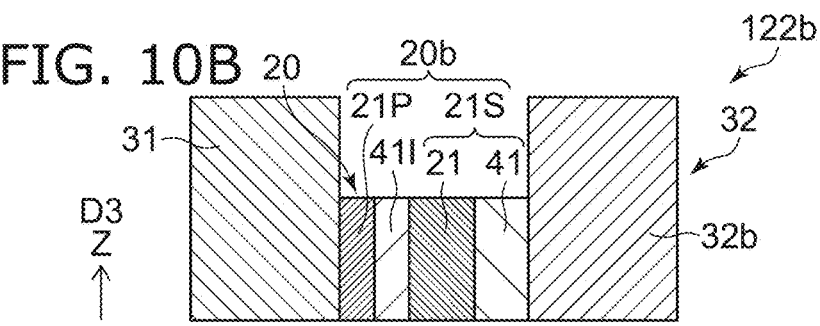
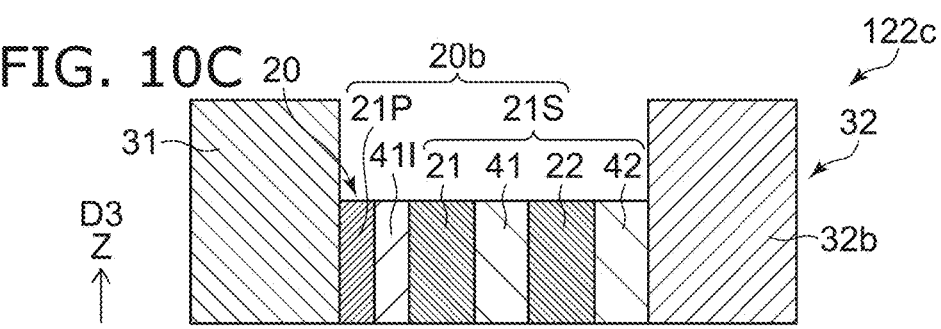
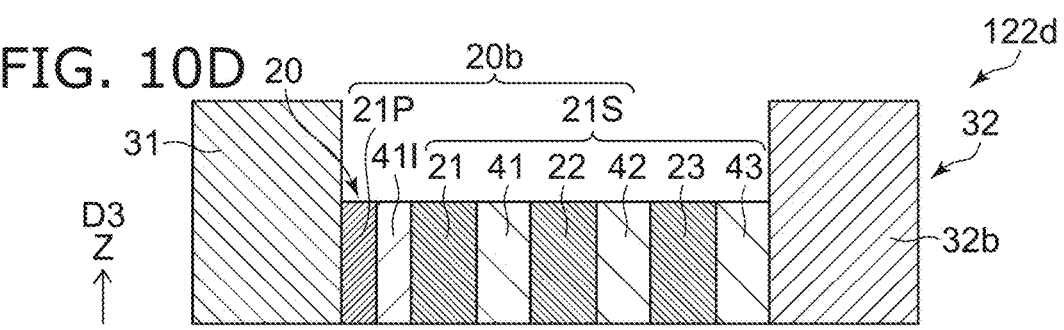
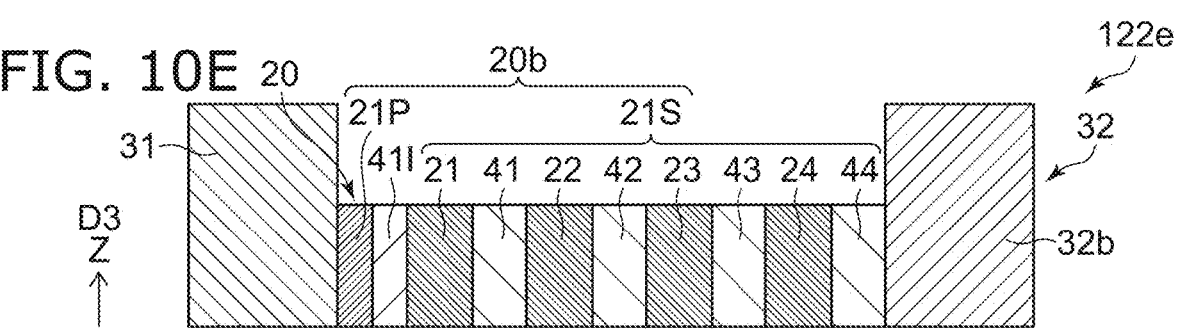

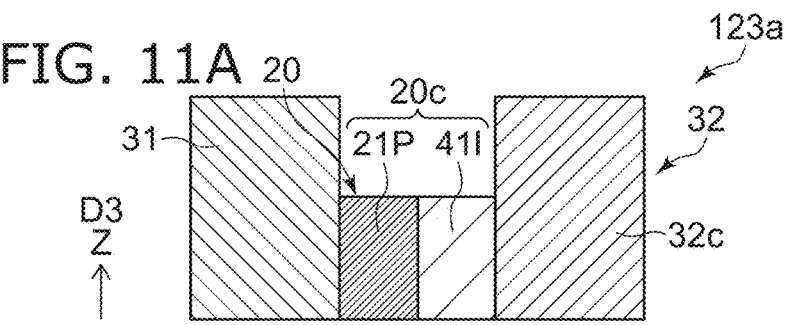
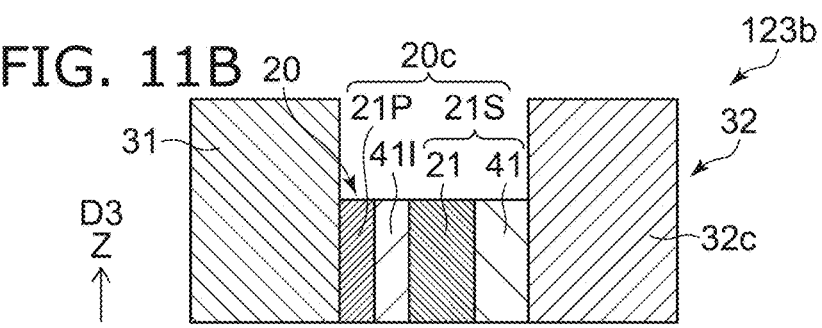
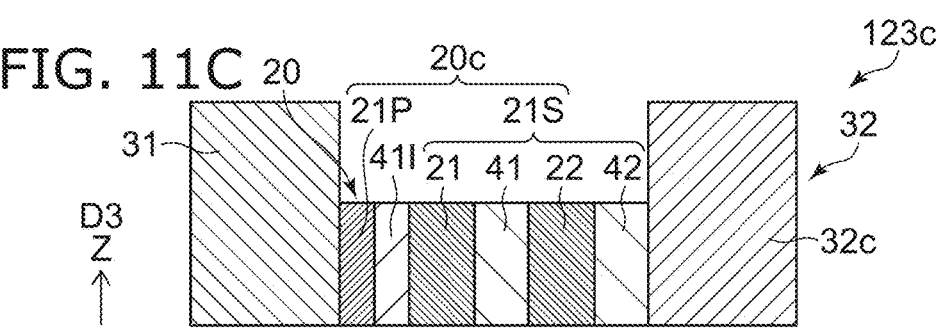
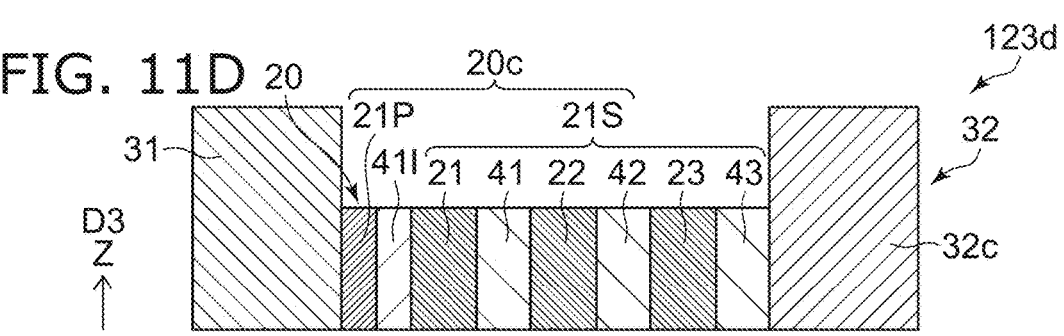
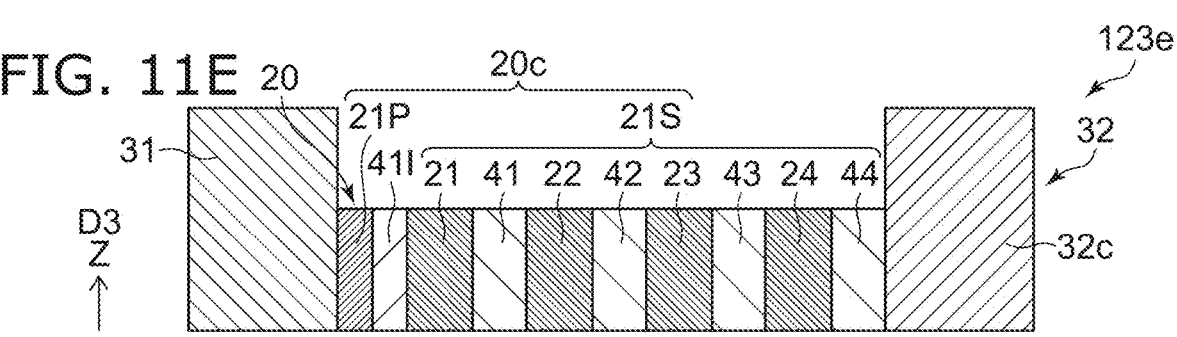

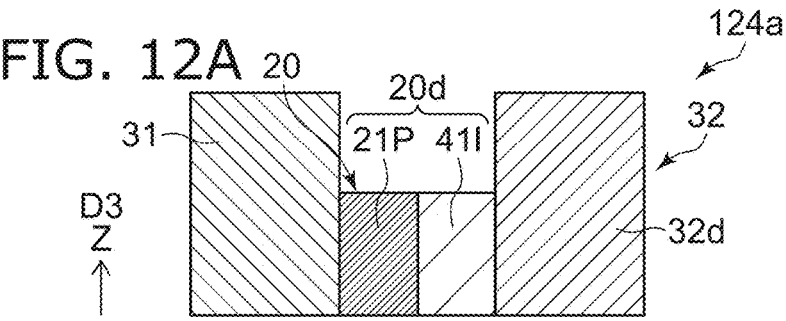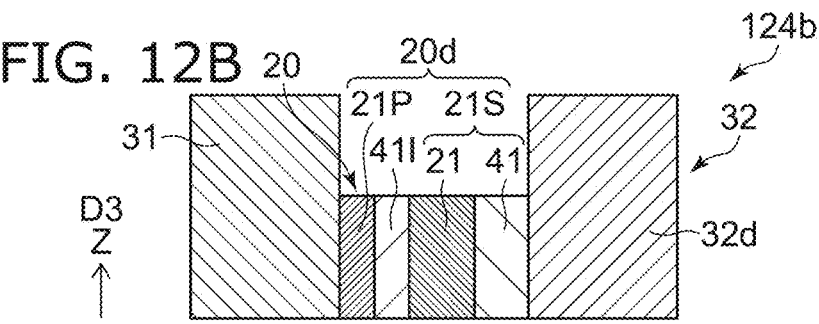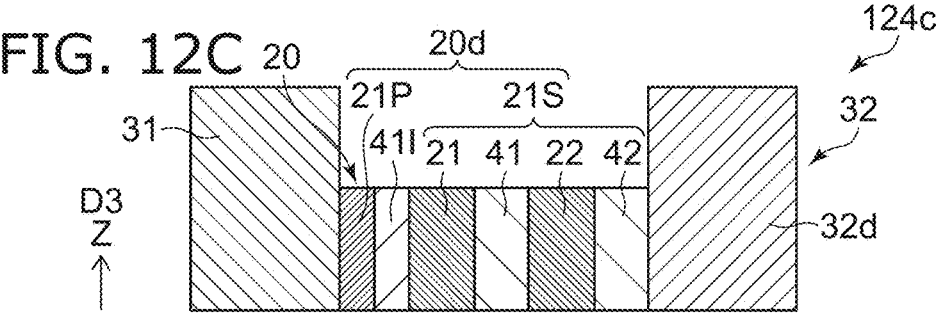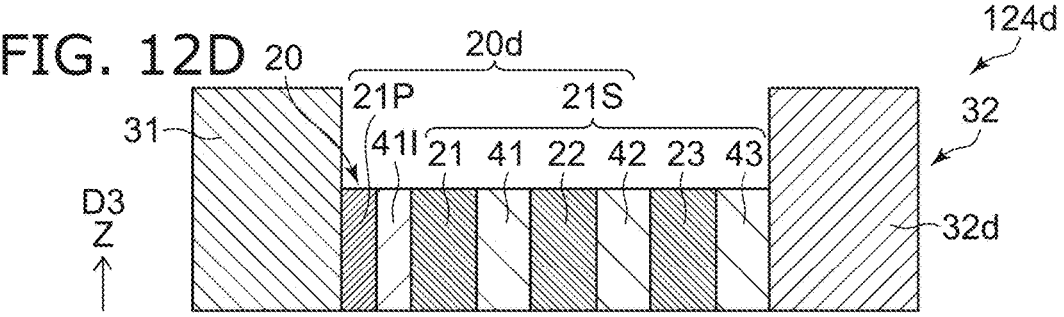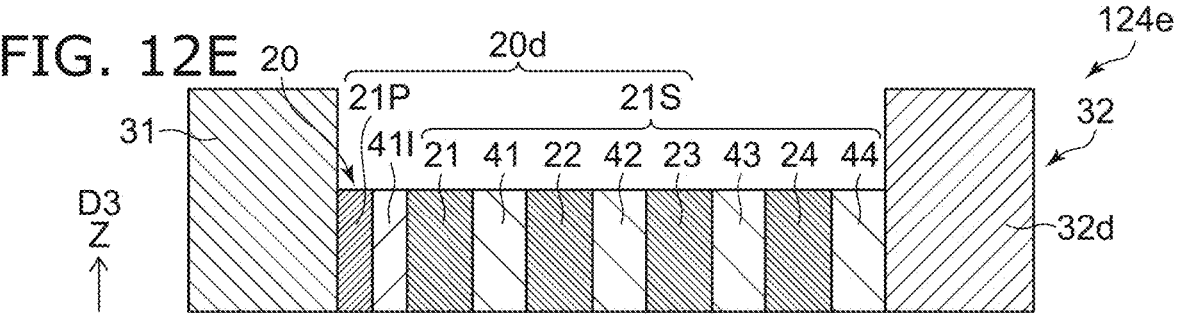

MAGNETIC HEAD WITH MULTILAYER CONFIGURATION BETWEEN MAGNETIC POLES AND MAGNETIC RECORDING DEVICE

CROSS-REFERENCE TO RELATED APPLICATIONS

This application is based upon and claims the benefit of priority from Japanese Patent Application No. 2022-168539, filed on Oct. 20, 2022; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the characteristics of the magnetic head.

BRIEF DESCRIPTION OF THE DRAWINGS

FIGS. 5A to 5E are schematic cross-sectional views illustrating magnetic heads according to the first embodiment;

FIGS. 7A to 7E are schematic cross-sectional views illustrating magnetic heads according to the first embodiment;

FIGS. 10A to 10E are schematic cross-sectional views illustrating magnetic heads according to the first embodiment;

FIGS. 11A to 11E are schematic cross-sectional views illustrating magnetic heads according to the first embodiment;

FIGS. 12A to 12E are schematic cross-sectional views illustrating magnetic heads according to the first embodiment;

DETAILED DESCRIPTION

Figure 1:
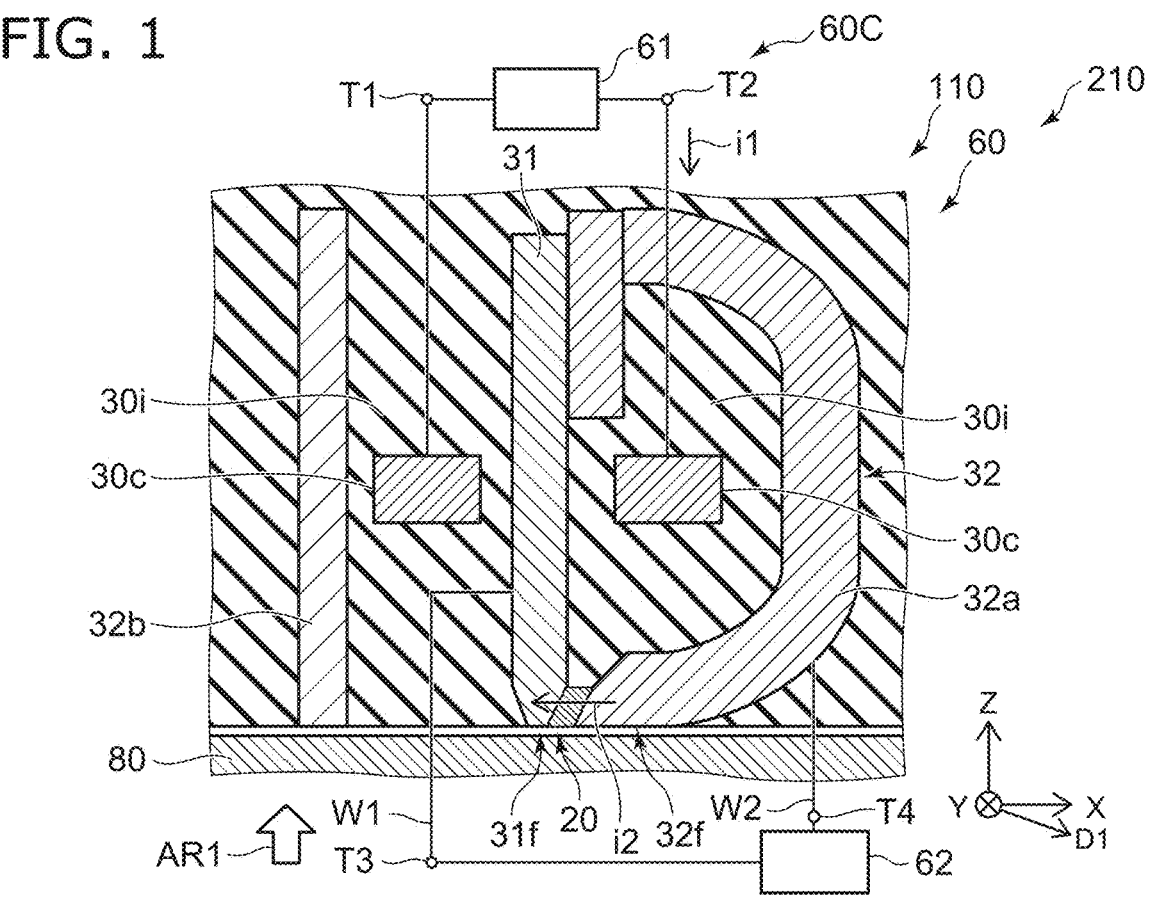
FIG. 1 is a schematic cross-sectional view illustrating a magnetic head according to a first embodiment.

According to one embodiment, a magnetic head includes a first magnetic pole, a second magnetic pole, a conductive part, an element part, a first terminal, a second terminal, a third terminal, and a fourth terminal. The conductive part is electrically insulated from the first magnetic pole and the second magnetic pole. The first terminal and the second terminal are electrically connected to the conductive part. The element part is provided between the first magnetic pole and the second magnetic pole and is electrically connected to the first magnetic pole and the second magnetic pole. The element part is conductive. The third terminal is electrically connected to the first magnetic pole. The fourth terminal is electrically connected to the second magnetic pole. A first magnetic pole temperature of the first magnetic pole in a first state is higher than a second magnetic pole temperature of the second magnetic pole in the first state. A first current is supplied between the first terminal and the second terminal in the first state.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

Figure 2:
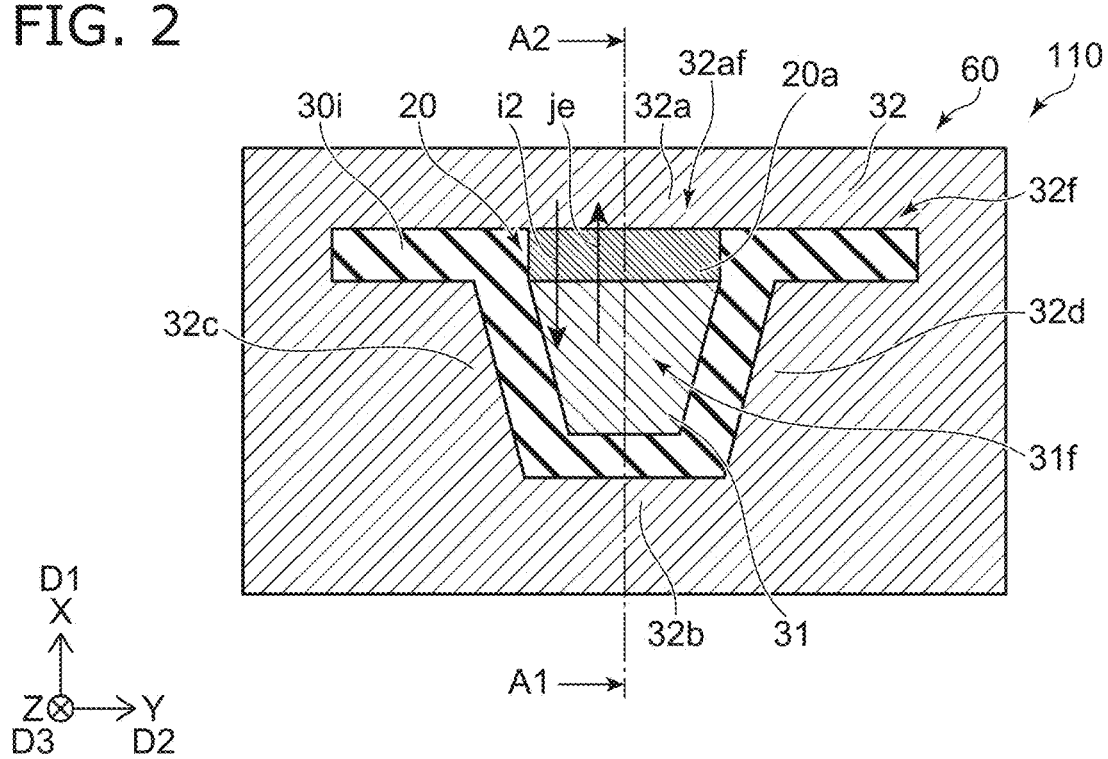
FIG. 2 is a schematic plan view illustrating the magnetic head according to the first embodiment.

FIG. 2 is a schematic plan view illustrating the magnetic head according to the first embodiment.

FIG. 2 is a plan view viewed in an arrow AR1 of FIG. 1. FIG. 1 is an A1-A2 line cross-sectional view of FIG. 2.

A magnetic head 110 according to the embodiment is included in a magnetic recording device 210. As shown in FIG. 1, the magnetic recording device 210 may include, for example, the magnetic head 110, a magnetic recording medium 80, and a controller 60C. A recording operation is performed in the magnetic head 110. In the recording operation, information is recorded on the magnetic recording medium 80 using the magnetic head 110. A reproducing operation may be performed in the magnetic head 110.

The magnetic head 110 includes a first magnetic pole 31, a second magnetic pole 32, a conductive part 30c and an element part 20. The magnetic head 110 may include a first terminal T1, a second terminal T2, a third terminal T3, and a fourth terminal T4.

The second magnetic pole 32 includes, for example, a first region 32a. The second magnetic pole 32 may include a second region 32b, and so on.

For example, the first magnetic pole 31 and the second magnetic pole 32 form a magnetic circuit. The first magnetic pole 31 is, for example, a main magnetic pole. The first region 32a of the second magnetic pole 32 is, for example, a trailing shield. The second region 32b is, for example, a leading shield.

As shown in FIG. 1, a direction from the magnetic recording medium 80 to the magnetic head 110 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, a height direction. The X-axis direction corresponds to, for example, a down-track direction. The Y-axis direction corresponds to, for example, a cross-track direction. The magnetic recording medium 80 and the magnetic head 110 move relatively along the down-track direction. A recording magnetic field generated by the magnetic head 110 is applied to a desired position on the magnetic recording medium 80. Magnetization at a desired position of the magnetic recording medium 80 is controlled in a direction corresponding to the recording magnetic field. Information is thus recorded on the magnetic recording medium 80.

As shown in FIG. 1, the first magnetic pole 31 includes a first magnetic pole face 31f. The first magnetic pole face 31f faces the magnetic recording medium 80, for example. The first magnetic pole face 31f is, for example, an ABS (Air Bearing Surface). The first magnetic pole face 31f is substantially along the X-Y plane, for example.

A first direction D1 from the first magnetic pole 31 to the first region 32a is along the X-axis direction. As shown in FIG. 1, the first magnetic pole 31 includes a surface facing the first region 32a. The first region 32a includes a surface facing the first magnetic pole 31. These planes may be inclined with respect to the Z-axis direction.

The conductive part 30c is electrically insulated from the first magnetic pole 31 and the second magnetic pole 32. For example, insulating members 30i are provided between the first magnetic pole 31 and the conductive part 30c and between the second magnetic pole 32 and the conductive part 30c. In one example, the conductive part 30c may be a recording coil.

The first terminal T1 and the second terminal T2 are electrically connected to the conductive part 30c. For example, the first terminal T1 is electrically connected to a part (e.g., one end) of the conductive part 30c. The second terminal T2 is electrically connected to another part (for example, the other end) of the conductive part 30c. A first current i1 can be supplied between the first terminal T1 and the second terminal T2.

When the recording coil is used as the conductive part 30c, the first current i1 may be a recording current. In the embodiment, the conductive part 30c may be provided separately from the recording coil. An example in which the recording coil is used as the conductive part 30c will be described below.

For example, the recording coil is supplied with the recording current corresponding to information to be recorded. A magnetic field (recording magnetic field) is generated from the first magnetic pole 31 by the recording current. Information is recorded on the magnetic recording medium 80 by the recording magnetic field.

As shown in FIG. 2, the element part 20 is conductive. As shown in FIGS. 1 and 2, the element part 20 is provided between the first magnetic pole 31 and the second magnetic pole 32. The element part 20 is electrically connected to the first magnetic pole 31 and the second magnetic pole 32.

For example, the element part 20 includes a first region element 20a. The first region element 20a is electrically conductive. The first region element 20a is provided between the first magnetic pole 31 and the first region 32a. The first region element 20a is electrically connected to the first magnetic pole 31 and the first region 32a.

As shown in FIG. 1, the third terminal T3 is electrically connected to the first magnetic pole 31. The fourth terminal T4 is electrically connected to the second magnetic pole 32. For example, the third terminal T3 is electrically connected to the first magnetic pole 31 by a first wiring W1. The fourth terminal T4 is electrically connected to the second magnetic pole 32 by a second wiring W2.

In the embodiment, a first state may be provided. In the first state, the first current i1 is supplied between the first terminal T1 and the second terminal T2. The temperature of the first magnetic pole 31 in the first state (first magnetic pole temperature) is higher than the temperature of the second magnetic pole 32 in the first state (second magnetic pole temperature). For example, the temperature of the first magnetic pole 31 (first magnetic pole temperature) in the first state is higher than the temperature of the first region 32a in the first state.

For example, the temperature of the first magnetic pole 31 rises due to Joule heat due to the first current i1 supplied to the conductive part 30c. As a result, the temperature of the first magnetic pole 31 in the first state becomes higher than the temperature of the second magnetic pole 32 (for example, the first region 32a) in the first state. The temperature difference causes, for example, a thermoelectric effect. As a result, for example, a potential difference is generated between the first magnetic pole 31 and the second magnetic pole 32 (first region 32a). By using the potential difference based on the temperature difference, for example, power consumption can be suppressed. For example, it is easy to obtain the element part 20 being stable.

As will be described later, an element current i2 is supplied to the element part 20 (e.g., the first region device 20a). Thereby, a magnetic field is generated from the element part 20. At least one of the orientation and magnitude of the recording magnetic field generated from the first magnetic pole 31, for example, is appropriately controlled by this magnetic field. This enables efficient recording operation.

Alternatively, an alternating magnetic field is generated from the element part 20 by supplying the element current i2 to the element part 20. The alternating magnetic field is, for example, a high frequency magnetic field. The application of the alternating magnetic field to the magnetic recording medium 80 assists the recording on the magnetic recording medium 80. For example, MAMR (Microwave Assisted Magnetic Recording) can be performed.

In the embodiment, as described above, the first current i1 supplied to the conductive part 30c causes a temperature difference. By using the potential difference based on the temperature difference, the voltage of the externally supplied element current i2 can be lowered. Thereby, the electric power supplied to the element part 20 can be suppressed. For example, thermal deterioration of the element part 20 can be suppressed. For example, it becomes easier to obtain stable characteristics in the element part 20. For example, the element part 20 having a long life can be obtained. For example, the element current i2 can be increased while maintaining high reliability. For example, high recording density can be obtained. According to the embodiment, for example, a magnetic head whose characteristics can be improved can be obtained.

When the temperature of the first magnetic pole 31 is higher than the temperature of the second magnetic pole 32, the potential of the first magnetic pole 31 tends to be higher than the potential of the second magnetic pole 32. It is considered that this is due to the thermoelectric effect at the element part 20, a first interface between the element part 20 and the first magnetic pole 31, and a second interface between the element part 20 and the second magnetic pole 32 (for example, the first region 32a). For example, the sum of the Seebeck coefficient at the element part 20, the Seebeck coefficient at the first interface, and the Seebeck coefficient at the second interface may be positive.

In the embodiment, the above temperature difference is obtained in the first state in which the first current i1 is supplied between the first terminal T1 and the second terminal T2. In this first state, no current (element current i2) may be supplied between the third terminal T3 and the fourth terminal T4. The temperature difference may occur in the first state in which the element current i2 does not flow through the element part 20.

As described above, the magnetic head 110 performs the recording operation (first operation). In the first operation, the first current i1 (for example, recording current) is supplied between the first terminal T1 and the second terminal T2. In the recording operation (first operation), the element current i2 is supplied between the third terminal T3 and the fourth terminal T4. As a result, at least one of the orientation and magnitude of the recording magnetic field is appropriately controlled. Alternatively, MAMR is performed.

The orientation of the device current i2 is, for example, the orientation from the fourth terminal T4 to the third terminal T3. The element current i2 flows through the element part 20, for example, in the orientation from the second magnetic pole 32 to the first magnetic pole 31 (see FIG. 2). An electron flow je flows through the element part 20, for example, in the orientation from the first magnetic pole 31 to the second magnetic pole 32 (see FIG. 2). For example, the element current i2 flows through the first region element 20a in the orientation from the first region 32a to the first magnetic pole 31, for example. The electron current je flows through the first region element 20a, for example, in the orientation from the first magnetic pole 31 to the first region 32a.

In the first operation (for example, recording operation), the magnetic field (recording magnetic field) is generated from the first magnetic pole 31 corresponding to the first current i1. The orientation of the magnetic field generated from the first magnetic pole 31 changes according to the orientation of the first current i1. In the first operation, information corresponding to the orientation of the first current i1 is recorded on the magnetic recording medium 80.

For example, the potential of the second magnetic pole 32 is higher than the potential of the first magnetic pole 31 when the element current i2 is supplied. When the temperature of the first magnetic pole 31 is higher than the temperature of the second magnetic pole 33, the potential of the first magnetic pole 31 tends to be higher than the potential of the second magnetic pole 32, for example, due to the temperature difference. This makes it possible to reduce the absolute value of the difference between the potential of the second magnetic pole 32 and the potential of the first magnetic pole 31 when the element current i2 flows. For example, power supplied to the element part 20 can be suppressed.

In the first operation (for example, recording operation), for example, the element current i2 flows through the first magnetic pole 31 and the second magnetic pole 32, thereby a change in the recording magnetic field corresponding to the first current i1 is promoted. For example, variations in changes in the recording magnetic field when the first current i1 is changed are suppressed. For example, variations in the difference between the time when the polarity of the first current i1 changes and the time when the polarity of the recording magnetic field changes are suppressed. For example, a stable first operation can be performed. For example, high writability can be obtained. For example, high recording density can be obtained.

As shown in FIG. 1, a first circuit 61 and a second circuit 62 may be provided. The first circuit 61 can supply the first current i1 between the first terminal T1 and the second terminal T2. The second circuit 62 can supply the element current i2 to the third terminal T3 and the fourth terminal T4. The first circuit 61 and the second circuit 62 are included in the controller 60C. The first circuit 61 and the second circuit 62 may be included in the magnetic recording device 210.

As shown in FIG. 1, the first magnetic pole 31 includes the first magnetic pole face 31f. The first magnetic pole face 31f faces the magnetic recording medium 80. The second magnetic pole 32 includes a second magnetic pole face 32f. The second magnetic pole face 32f faces the magnetic recording medium 80. As shown in FIG. 2, the first magnetic pole face 31f is smaller than the second magnetic pole face 32f. For example, the volume of the first magnetic pole 31 is smaller than the volume of the second magnetic pole 32. The temperature of the first magnetic pole 31 tends to rise. For example, a potential difference based on a temperature difference can be effectively obtained.

As shown in FIG. 2, the first region 32a includes a first region face 32af. The first region face 32af faces the magnetic recording medium 80. As shown in FIG. 2, the first magnetic pole face 31f may be smaller than the first region face 32af.

As shown in FIG. 2, the second magnetic pole 32 may further include a third region 32c. A second direction D2 from the third region 32c to the first magnetic pole 31 crosses the first direction D1 from the first magnetic pole 31 to the first region 32a. The second direction D2 is, for example, the Y-axis direction. The Z-axis direction is, for example, along the third direction D3. The third direction D3 crosses a plane including the first direction D1 and the second direction D2.

As shown in FIG. 2, the second magnetic pole 32 may further include a fourth region 32d. A direction from the third region 32c to the fourth region 32d is along the second direction D2. The first magnetic pole 31 is between the third region 32c and the fourth region 32d in the second direction D2. The third region 32c and the fourth region 32d are side shields, for example. By providing the third region 32c and the fourth region 32d, the recording magnetic field generated from the first magnetic pole 31 is controlled and applied to the magnetic recording medium 80 efficiently.

Several examples of magnetic heads according to the embodiment will be described below. In the following, description of the same configuration as that of the magnetic head 110 described above will be omitted.

Figure 3:
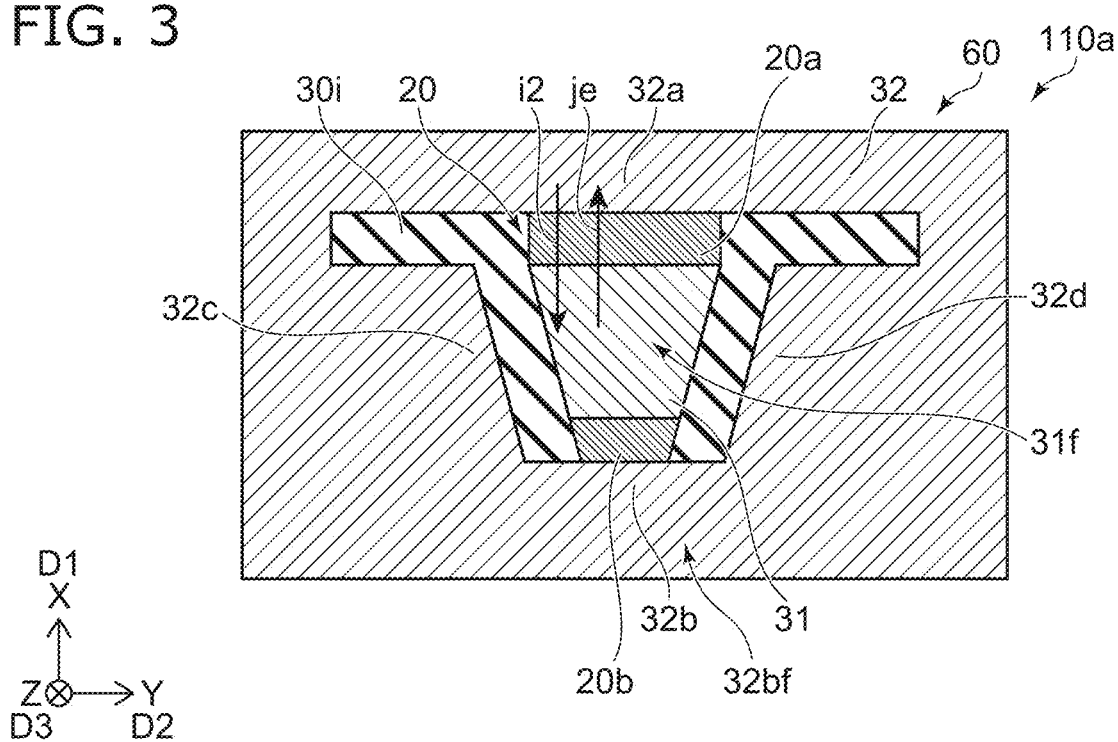
FIG. 3 is a schematic plan view illustrating a magnetic head according to the first embodiment.

FIG. 3 is a schematic plan view illustrating a magnetic head according to the first embodiment.

As shown in FIG. 3, in a magnetic head 110a according to the embodiment, the element part 20 includes a second region element 20b. As already described, the second magnetic pole 32 further includes the second region 32b. The first magnetic pole 31 is between the second region 32b and the first region 32a. The second region element 20b is electrically conductive. The second region element 20b is provided between the second region 32b and the first magnetic pole 31.

In the magnetic head 110a, in the first operation (for example, recording operation), the element current i2 oriented from the second region 32b to the first magnetic pole 31 flows through the second region element 20b.

In the magnetic head 110a, the first magnetic pole face 31f is smaller than the second magnetic pole face 32f. As shown in FIG. 3, the second region 32b may include a second region face 32bf. The second region face 32bf faces the magnetic recording medium 80. The first magnetic pole face 31f may be smaller than the second region face 32bf.

Figure 4:
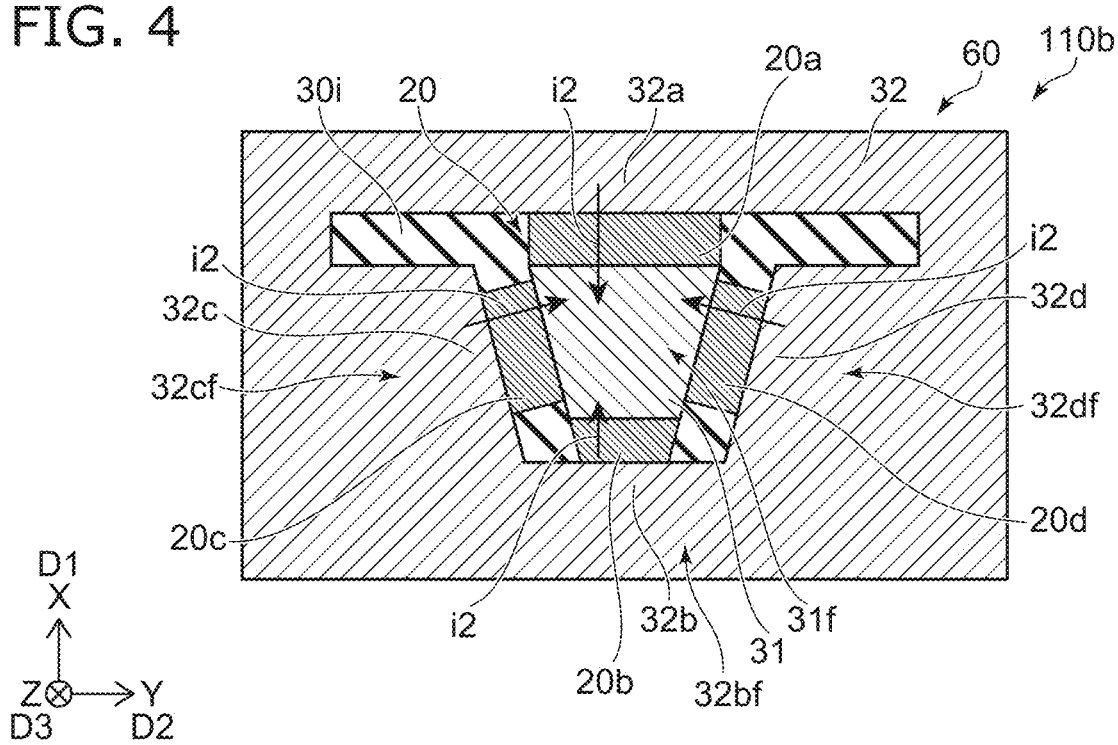
FIG. 4 is a schematic plan view illustrating a magnetic head according to the first embodiment.

FIG. 4 is a schematic plan view illustrating a magnetic head according to the first embodiment.

As shown in FIG. 4, a magnetic head 110b according to the embodiment includes a third region element 20c. As already described, the second magnetic pole 32 includes the third region 32c. A direction from the third region 32c to the first magnetic pole 31 is along the second direction D2. The third region element 20c is electrically conductive. The third region element 20c is provided between the third region 32c and the first magnetic pole 31.

The magnetic head 110b may include a fourth region element 20d. As already described, the second magnetic pole 32 includes the fourth region 32d. A direction from the third region 32c to the fourth region 32d is along the second direction D2. The first magnetic pole 31 is between the third region 32c and the fourth region 32d. The fourth region element 20d is electrically conductive. The fourth region element 20d is provided between the first magnetic pole 31 and the fourth region 32d.

In the magnetic head 110b, in the first operation (for example, recording operation), the element current i2 oriented from the third region 32c to the first magnetic pole 31 flows through the third region element 20c. In the first operation (for example, recording operation), the element current i2 oriented from the fourth region 32d to the first magnetic pole 31 flows through the fourth region element 20d.

In the magnetic head 110b, the first magnetic pole face 31f is smaller than the second magnetic pole face 32f. As shown in FIG. 4, the third region 32c may include a third region face 32cf. The third region face 32cf faces the magnetic recording medium 80. The first magnetic pole face 31f may be smaller than the third region face 32cf. As shown in FIG. 4, the fourth region 32d may include a fourth region face 32df. The fourth region face 32df faces the magnetic recording medium 80. The first magnetic pole face 31f may be smaller than the fourth region face 32df.

In the magnetic head 110a and the magnetic head 110b, the temperature of the first magnetic pole 31 is higher than the temperature of the second magnetic pole 32 in the first state. The first potential of the first magnetic pole 31 is higher than the second potential of the second magnetic pole 32 in the first state in which the element current i2 does not flow. For example, power supplied to the element part 20 can be suppressed. For example, thermal deterioration of the element part 20 can be suppressed. For example, a magnetic head whose characteristics can be improved can be obtained.

Several examples of the element part 20 will be described below.

FIGS. 5A to 5E are schematic cross-sectional views illustrating magnetic heads according to the first embodiment.

As shown in FIG. 5A, in a magnetic head 111a according to the embodiment, the element part 20 (for example, the first region element 20a) includes a first magnetic pole side non-magnetic layer 41P. The first magnetic pole side non-magnetic layer 41P is in contact with the first magnetic pole 31. The first magnetic pole side non-magnetic layer 41P includes at least one selected from the group consisting of Ru, Ta, Ir, Rh, Pd, Pt and W (first element group).

As shown in FIG. 5B, in a magnetic head 111b according to the embodiment, the element part 20 (for example, the first region element 20a) includes the first magnetic pole side non-magnetic layer 41P and a first stacked body 21S. The first magnetic pole side non-magnetic layer 41P is between the first magnetic pole 31 and the first stacked body 21S. In this example, the first stacked body 21S includes a first magnetic layer 21 and a first non-magnetic layer 41. The first magnetic layer 21 is between the first magnetic pole side non-magnetic layer 41P and the first non-magnetic layer 41. In this example, the first non-magnetic layer 41 includes at least one selected from the group (second element group) consisting of Cu, Au, Cr, V, Al, and Ag.

As shown in FIG. 5C, in a magnetic head 111c according to the embodiment, the first stacked body 21S further includes a second magnetic layer 22 and a second non-magnetic layer 42. The second magnetic layer 22 is between the first magnetic layer 21 and the second non-magnetic layer 42. The second non-magnetic layer 42 may include at least one selected from the above first element group or at least one selected from the above second element group.

As shown in FIG. 5D, in a magnetic head 111d according to the embodiment, the first stacked body 21S further includes a third magnetic layer 23 and a third non-magnetic layer 43. The third magnetic layer 23 is between the second magnetic layer 22 and the third non-magnetic layer 43. The third non-magnetic layer 43 may include at least one selected from the above first element group or at least one selected from the above second element group.

As shown in FIG. 5E, in a magnetic head 111e according to the embodiment, the first stacked body 21S further includes a fourth magnetic layer 24 and a fourth non-magnetic layer 44. The fourth magnetic layer 24 is between the third magnetic layer 23 and the fourth non-magnetic layer 44. The fourth non-magnetic layer 44 may include at least one selected from the above first element group or at least one selected from the above second element group.

At least one of the first magnetic layer 21, the second magnetic layer 22, the third magnetic layer 23 and the fourth magnetic layer 24 includes at least one selected from the group consisting of Fe, Co, and Ni.

FIGS. 6A to 6E, 7A to 7E, and 8A to 8E are schematic cross-sectional views illustrating magnetic heads according to the first embodiment.

Figure 6A:
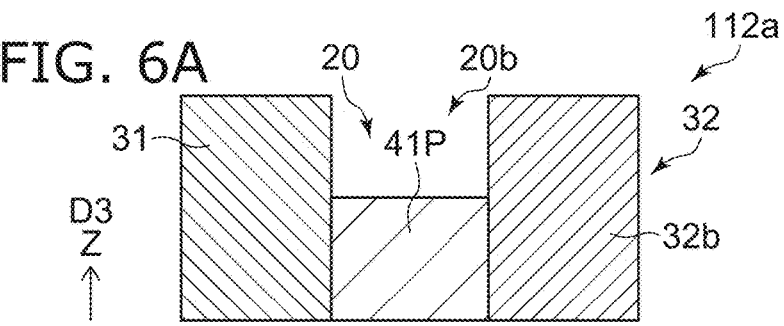
FIGS. 6A to 6E are schematic cross-sectional views illustrating magnetic heads according to the first embodiment.
Figure 8A:
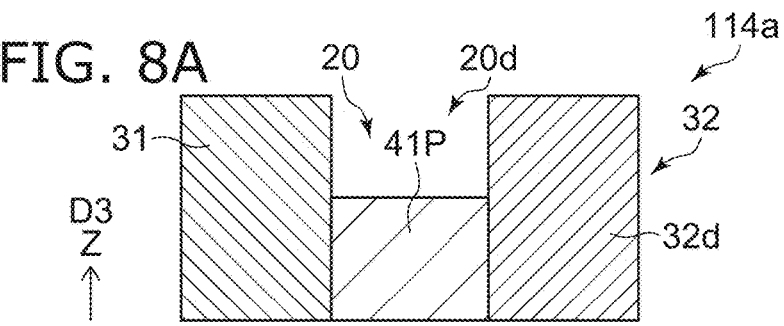
FIGS. 8A to 8E are schematic cross-sectional views illustrating magnetic heads according to the first embodiment.

As shown in FIGS. 6A, 7A, and 8A, in a magnetic head 112a, a magnetic head 113a, and a magnetic head 114a, the element part 20 (for example, the second region element 20b, the third region element 20c and the fourth region element 20d) may include the first magnetic pole side non-magnetic layer 41P described above.

Figure 6B:
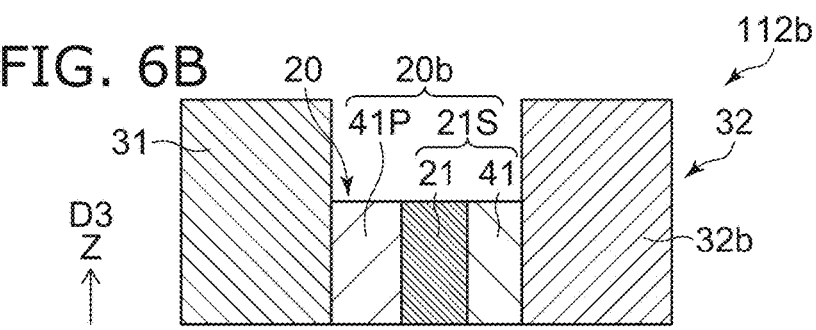
Figure 8B:
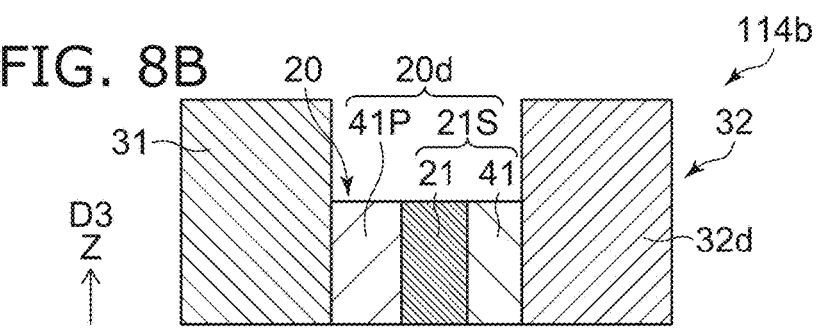

As shown in FIGS. 6B, 7B, and 8B, in a magnetic head 112b, a magnetic head 113b, and a magnetic head 114b, the element part 20 (for example, the second region element 20b, the third region element 20c and the fourth region element 20d) may include the first magnetic pole side non-magnetic layer 41P and the first stacked body 21S. The first stacked body 21S includes the first magnetic layer 21 and the first non-magnetic layer 41.

Figure 6C:
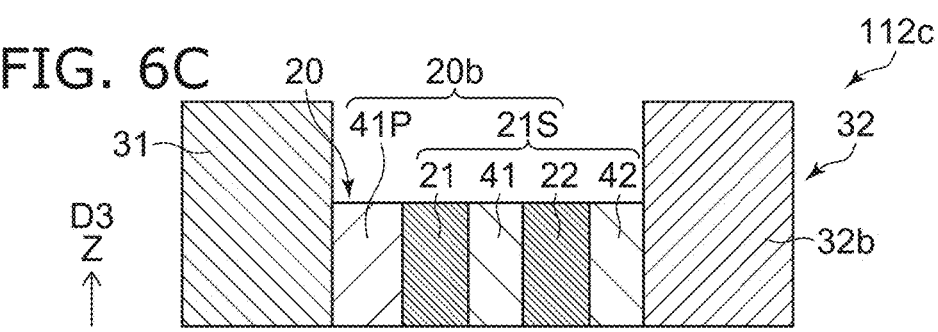
Figure 8C:
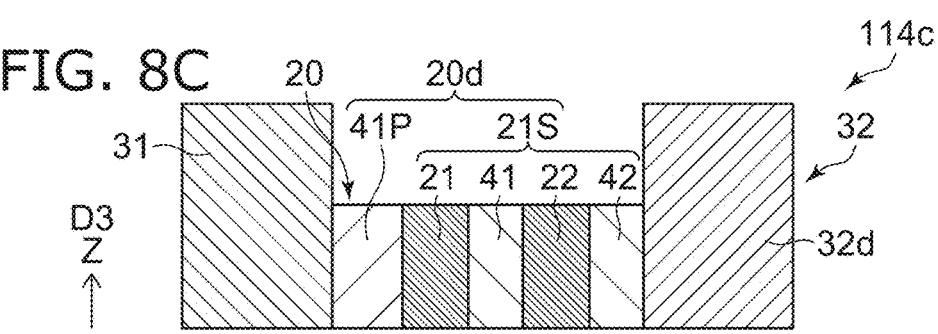

As shown in FIGS. 6C, 7C, and 8C, in a magnetic head 112c, a magnetic head 113c, and a magnetic head 114c, in the element part 20 (for example, the second region element 20b, the third region element 20c and the fourth region element 20d), the first stacked body 21S may further include the second magnetic layer 22 and the second non-magnetic layer 42.

Figure 6D:
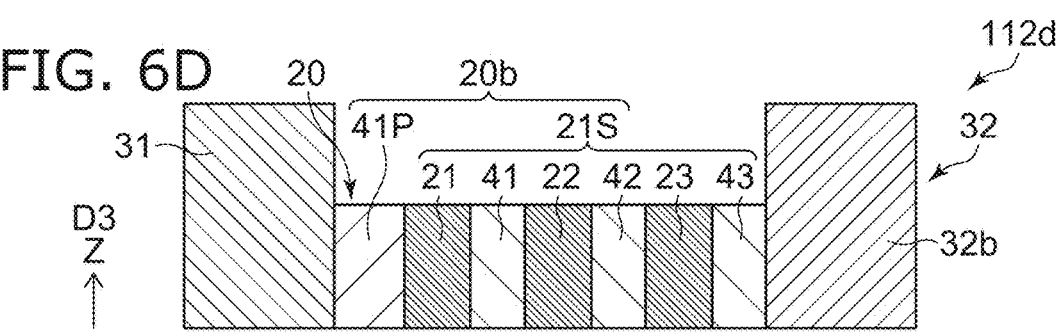
Figure 8D:
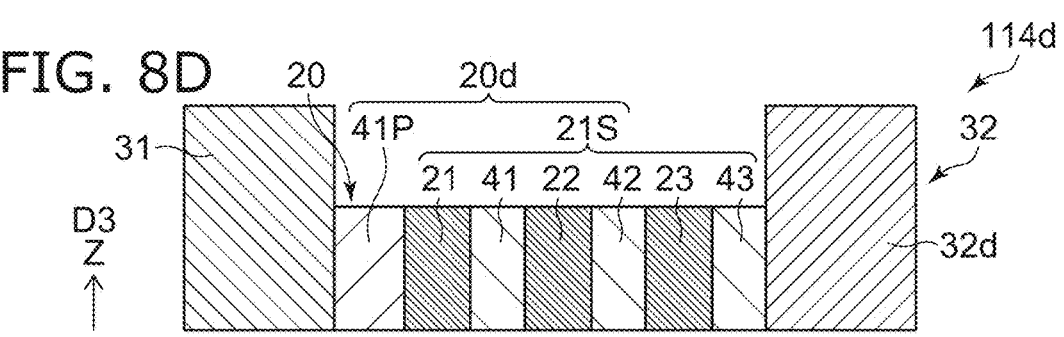

As shown in FIGS. 6D, 7D, and 8D, in a magnetic head 112d, a magnetic head 113d, and a magnetic head 114d, in the element part 20 (for example, the second region element 20b, the third region element 20c and the fourth region element 20d), the first stacked body 21S may further include the third magnetic layer 23 and the third non-magnetic layer 43.

Figure 6E:
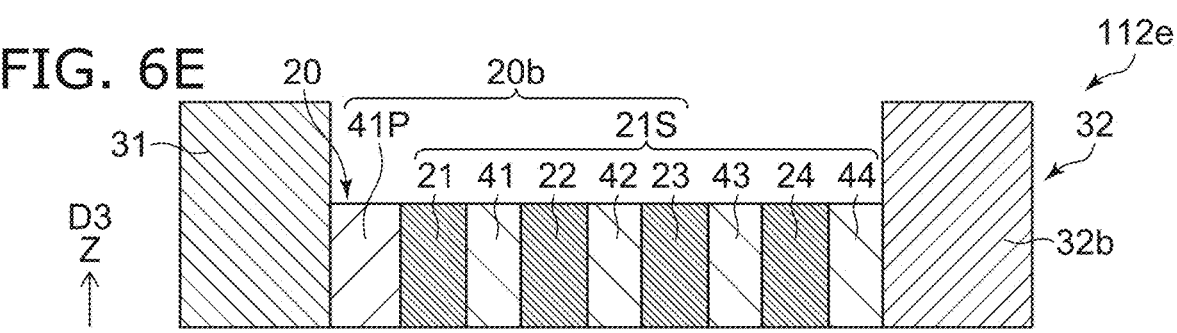
Figure 8E:
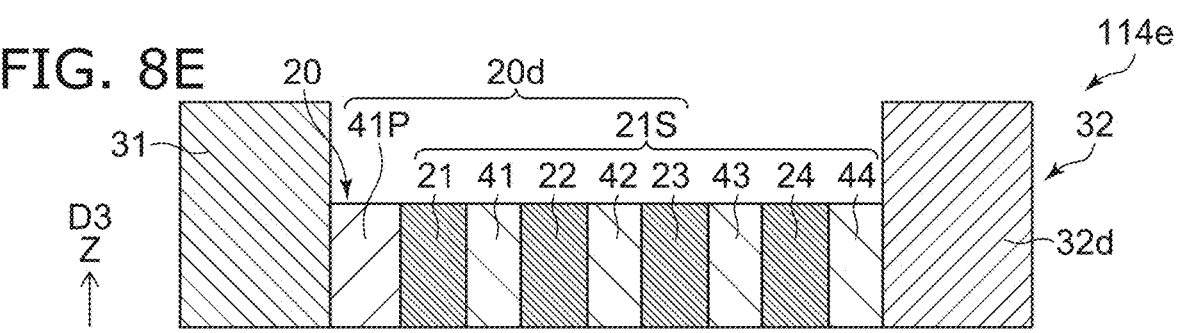

As shown in FIGS. 6E, 7E, and 8E, in a magnetic head 112e, a magnetic head 113e, and a magnetic head 114e, in the element part 20 (for example, the second region element 20b, the third region element 20c and the fourth region element 20d), the first stacked body 21S may further include the fourth magnetic layer 24 and the fourth non-magnetic layer 44.

In the magnetic head 111a, the magnetic head 112a, the magnetic head 113a, and the magnetic head 114a, at least one of the orientation and magnitude of the recording magnetic field is appropriately controlled.

The magnetization of the first magnetic layer 21 is reversed with respect to the magnetization of the first magnetic pole 31 in the magnetic head 111b, the magnetic head 112b, the magnetic head 113b, and the magnetic head 114b. At least one of the orientation and magnitude of the recording magnetic field is appropriately controlled.

In one example of at least one of the magnetic head 111c, the magnetic head 112c, the magnetic head 113c, the magnetic head 114c, the magnetic head 111d, the magnetic head 112d, the magnetic head 113d, the magnetic head 114d, the magnetic head 111e, the magnetic head 112e, the magnetic head 113e and the magnetic head 114e, an alternating magnetic field is generated from the first stacked body 21S. MAMR is performed. In one example, at least one of the magnetization of the first magnetic layer 21 and the magnetization of the second magnetic layer 22 is reversed with respect to the magnetization of the first magnetic pole 31. At least one of the orientation and magnitude of the recording magnetic field is appropriately controlled. MAMR and control of the orientation and/or magnitude of the recording magnetic field may be performed.

FIGS. 9A to 9E are schematic cross-sectional views illustrating magnetic heads according to the first embodiment.

Figure 9A:
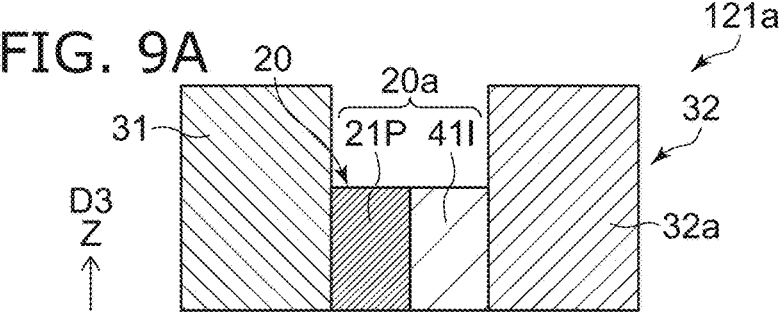
FIGS. 9A to 9E are schematic cross-sectional views illustrating magnetic heads according to the first embodiment.

As shown in FIG. 9A, in a magnetic head 121a according to the embodiment, the element part 20 (for example, the first region element 20a) includes a first magnetic pole side magnetic layer 21P and a non-magnetic intermediate layer 411. The first magnetic pole side magnetic layer 21P is provided between the first magnetic pole 31 and the non-magnetic intermediate layer 411. The non-magnetic intermediate layer 411 includes at least one selected from the group (second group) consisting of Cu, Au, Cr, V, Al, and Ag. The first magnetic pole side magnetic layer 21P includes at least one selected from the group consisting of Fe, Co, and Ni, at least one selected from the group (third group) consisting of Cr, V, Mn, Ti and Sc. The first magnetic pole side magnetic layer 21P has, for example, negative polarization. For example, the first magnetic pole side magnetic layer 21P is in contact with the non-magnetic intermediate layer 411. For example, the first magnetic pole side magnetic layer 21P contacts the first magnetic pole 31.

Figure 9B:
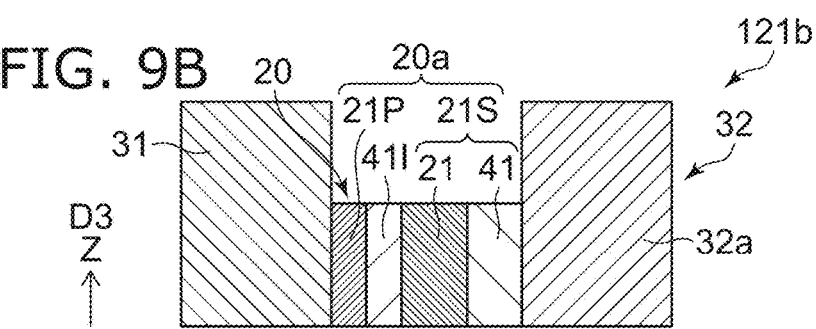

As shown in FIG. 9B, in a magnetic head 121b according to the embodiment, the element part 20 (for example, the first region element 20a) further includes the first stacked body 21S. The non-magnetic intermediate layer 411 is between the first magnetic pole side magnetic layer 21P and the first stacked body 21S. The first stacked body 21S includes the first magnetic layer 21 and the first non-magnetic layer 41. The first magnetic layer 21 is between the non-magnetic intermediate layer 411 and the first non-magnetic layer 41. The first non-magnetic layer 41 may include, for example, at least one selected from the above first element group or at least one selected from the above second element group.

Figure 9C:
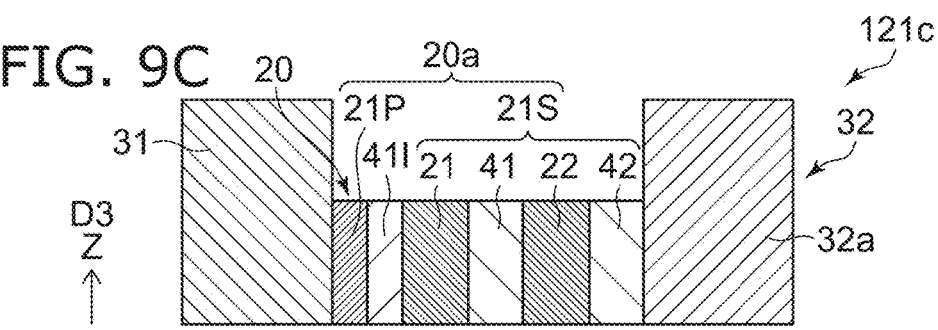

As shown in FIG. 9C, in a magnetic head 121c according to the embodiment, the first stacked body 21S further includes the second magnetic layer 22 and the second non-magnetic layer 42. The second magnetic layer 22 is between the first magnetic layer 21 and the second non-magnetic layer 42. The second non-magnetic layer 42 may include at least one selected from the above first element group or at least one selected from the above second element group.

Figure 9D:
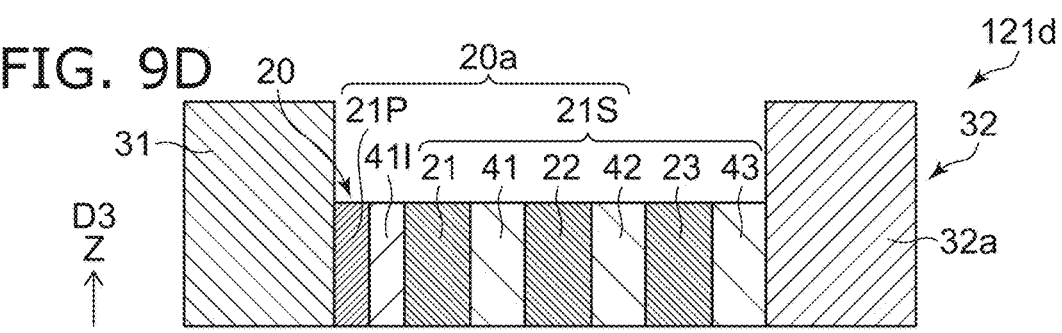

As shown in FIG. 9D, in a magnetic head 121d according to the embodiment, the first stacked body 21S further includes the third magnetic layer 23 and the third non-magnetic layer 43. The third magnetic layer 23 is between the second magnetic layer 22 and the third non-magnetic layer 43. The third non-magnetic layer 43 may include at least one selected from the above first element group or at least one selected from the above second element group.

Figure 9E:
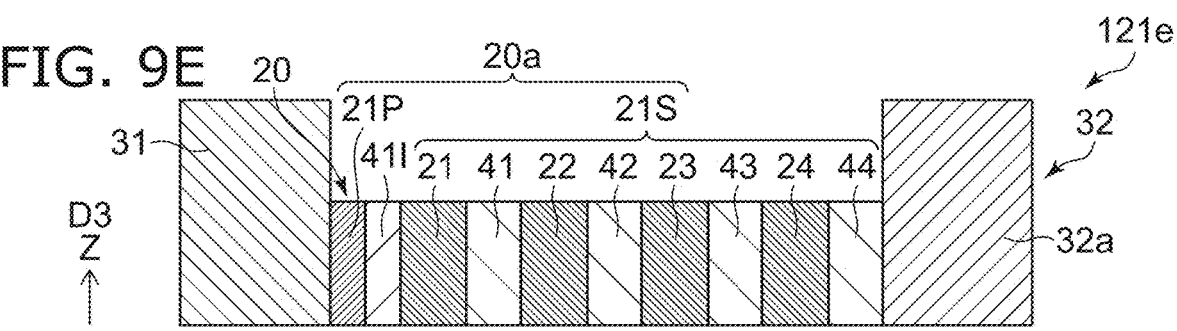

As shown in FIG. 9E, in a magnetic head 121e according to the embodiment, the first stacked body 21S further includes the fourth magnetic layer 24 and the fourth non-magnetic layer 44. The fourth magnetic layer 24 is between the third magnetic layer 23 and the fourth non-magnetic layer 44. The fourth non-magnetic layer 44 may include at least one selected from the above first element group or at least one selected from the above second element group.

At least one of the first magnetic layer 21, the second magnetic layer 22, the third magnetic layer 23 and the fourth magnetic layer 24 includes at least one selected from the group consisting of Fe, Co, and Ni.

FIGS. 10A to 10E, 11A to 11E, and 12A to 12E are schematic cross-sectional views illustrating magnetic heads according to the first embodiment.

As shown in FIGS. 10A, 11A, and 12A, in a magnetic head 122a, a magnetic head 123a, and a magnetic head 124a, the element part 20 (for example, the second region element 20b, the third region element 20c and the fourth region element 20d) may include the first magnetic pole side magnetic layer 21P and the non-magnetic intermediate layer 411 described above.

As shown in FIGS. 10B, 11B, and 12B, in a magnetic head 122b, a magnetic head 123b, and a magnetic head 124b, the element part 20 (for example, the second region element 20b, the third region element 20c and the fourth region element 20d) may include the first magnetic pole side magnetic layer 21P, the non-magnetic intermediate layer 411 and the first stacked body 21S. The first stacked body 21S includes the first magnetic layer 21 and the first non-magnetic layer 41.

As shown in FIGS. 10C, 11C, and 12C, in a magnetic head 122c, a magnetic head 123c, and a magnetic head 124c, in the element part 20 (for example, the second region element 20b, the third region element 20c and the fourth region element 20d), the first stacked body 21S may further include the second magnetic layer 22 and the second non-magnetic layer 42.

As shown in FIGS. 10D, 11D, and 12D, in a magnetic head 122d, a magnetic head 123d, and a magnetic head 124d, in the element part 20 (for example, the second region element 20b, the third region element 20c and the fourth region element 20d), the first stacked body 21S may further include the third magnetic layer 23 and the third non-magnetic layer 43.

As shown in FIGS. 10E, 11E, and 12E, in a magnetic head 122e, a magnetic head 123e, and a magnetic head 124e, in the element part 20 (for example, the second region element 20b, the third region element 20c and the fourth region element 20d), the first stacked body 21S may further include the fourth magnetic layer 24 and the fourth non-magnetic layer 44.

In the magnetic head 121a, the magnetic head 122a, the magnetic head 123a, and the magnetic head 124a, at least one of the orientation and magnitude of the recording magnetic field is appropriately controlled.

The magnetization of the first magnetic layer 21 is reversed with respect to the magnetization of the first magnetic pole 31 in the magnetic head 121b, the magnetic head 122b, the magnetic head 123b, and the magnetic head 124b. At least one of the orientation and magnitude of the recording magnetic field is appropriately controlled.

In one example of at least one of the magnetic head 121c, the magnetic head 122c, the magnetic head 123c, the magnetic head 124c, the magnetic head 121d, the magnetic head 122d, the magnetic head 123d, the magnetic head 124d, the magnetic head 121e, the magnetic head 122e, the magnetic head 123e and the magnetic head 124e, an alternating magnetic field is generated from the first stacked body 21S. MAMR is performed. In one example, at least one of the magnetization of the first magnetic layer 21 and the magnetization of the second magnetic layer 22 is reversed with respect to the magnetization of the first magnetic pole 31. At least one of the orientation and magnitude of the recording magnetic field is appropriately controlled. MAMR and control of the orientation and/or magnitude of the recording magnetic field may be implemented.

In the embodiment, the first region element 20a, the second region element 20b, the third region element 20c and/or the fourth region element 20d may be provided. For example, the first region 32a may be the leading shield and the second region 32b may be the trailing shield. For example, the first region element 20a and the second region element 20b may be omitted and the third region element 20c may be provided. In this case, the third region element 20c may be regarded as the "first region element".

Any combination of these configurations illustrated in FIGS. 5A to 5E, 6A to 6E, 7A to 7E, 8A to 8E, and 9A to 9E, 10A to 10E, 11A to 11E, and 12A to 12E may be applied.

Figure 13:
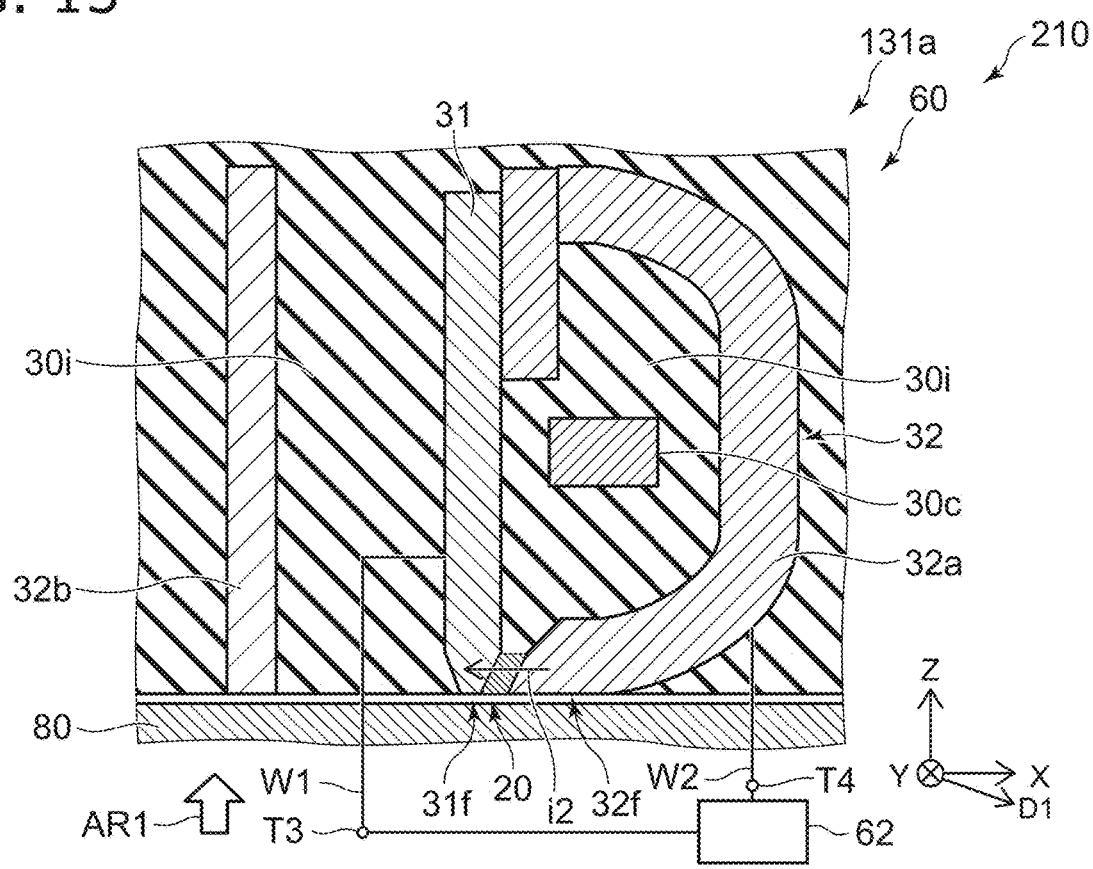
FIG. 13 is a schematic cross-sectional view illustrating a magnetic head according to the first embodiment.

FIG. 13 is a schematic cross-sectional view illustrating a magnetic head according to the first embodiment.

As shown in FIG. 13, in a magnetic head 131a according to the embodiment, the recording coil (conductive part 30c) is provided between the first magnetic pole 31 and the first region 32a of the second magnetic pole 32. The recording coil (the conductive part 30c) need not be provided between the first magnetic pole 31 and the second region 32b.

Figure 14:
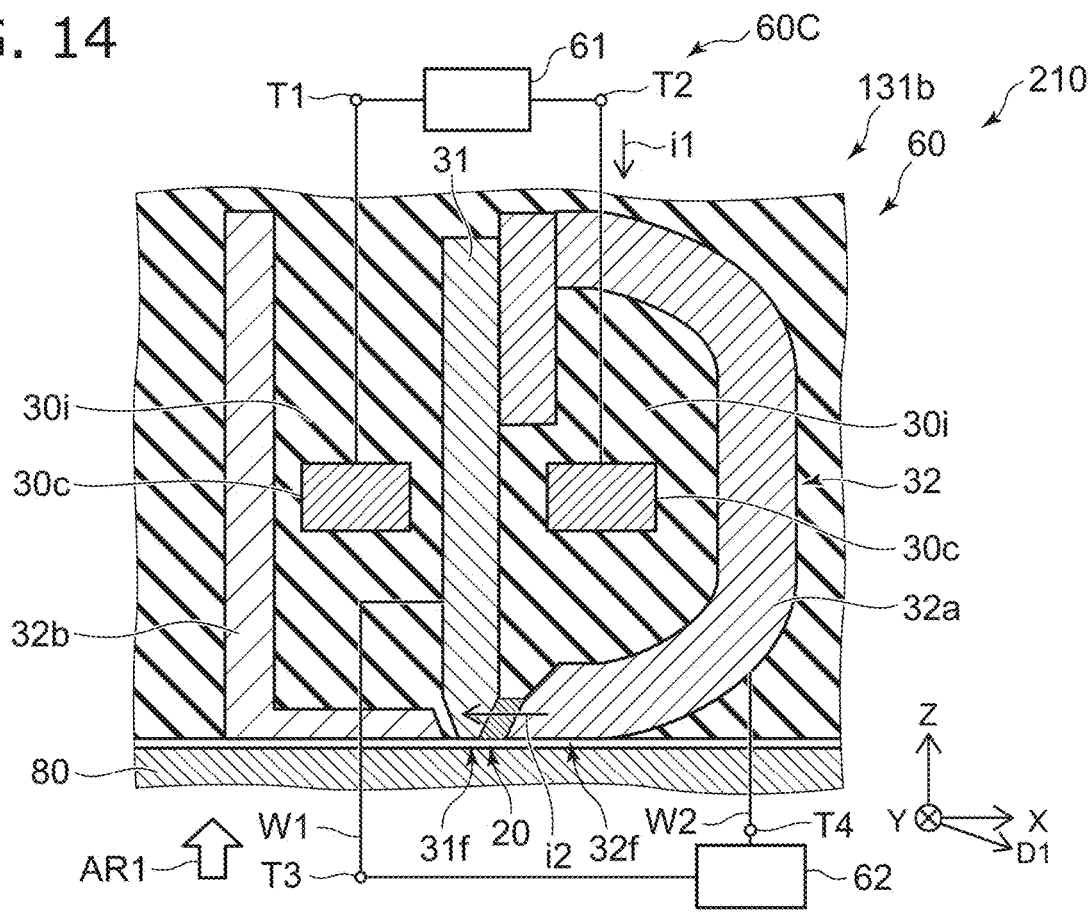
FIG. 14 is a schematic cross-sectional view illustrating a magnetic head according to the first embodiment.

FIG. 14 is a schematic cross-sectional view illustrating a magnetic head according to the first embodiment.

As shown in FIG. 14, in a magnetic head 131b according to the embodiment, the second region 32b of the second magnetic pole 32 may include a portion along the Z-axis direction and a portion extending along the X-Y plane. The area of the second region 32b is likely to expand. The second region 32b may include a portion extending along the X-Y plane and may not include a portion extending along the Z-axis direction.

Second Embodiment

In the following embodiments, the magnetic head (such as the magnetic head 110) described in relation to the first embodiment and modifications thereof are applied. An example in which the magnetic head 110 is used will be described below.

Figure 15:
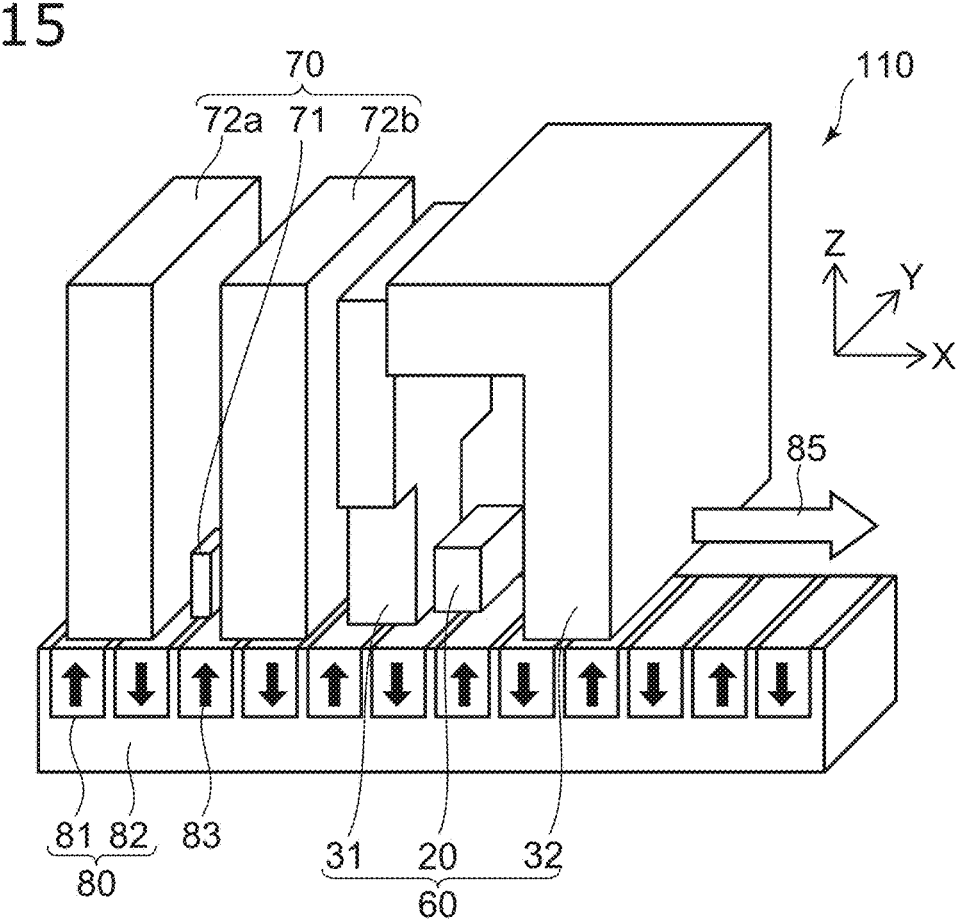
FIG. 15 is a schematic perspective view illustrating a magnetic recording device according to a second embodiment.

FIG. 15 is a schematic perspective view illustrating a magnetic recording device according to a second embodiment.

As shown in FIG. 15, the magnetic head (e.g., magnetic head 110) according to the embodiment is used together with the magnetic recording medium 80. In this example, the magnetic head 110 includes a recording part 60 and a reproducing part 70. Information is recorded on the magnetic recording medium 80 by the recording part 60 of the magnetic head 110. Information recorded on the magnetic recording medium 80 is reproduced by the reproducing part 70.

The magnetic recording medium 80 includes, for example, a medium substrate 82 and a magnetic recording layer 81 provided on the medium substrate 82. The magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 can output a signal corresponding to the magnetization 83 of the magnetic recording layer 81.

As shown in FIG. 15, the magnetic recording medium 80 moves relative to the magnetic head 110 in a direction of medium movement 85. Information corresponding to the magnetization 83 of the magnetic recording layer 81 is controlled at an arbitrary position by the magnetic head 110. Information corresponding to the magnetization 83 of the magnetic recording layer 81 is reproduced at an arbitrary position by the magnetic head 110.

Figure 16:
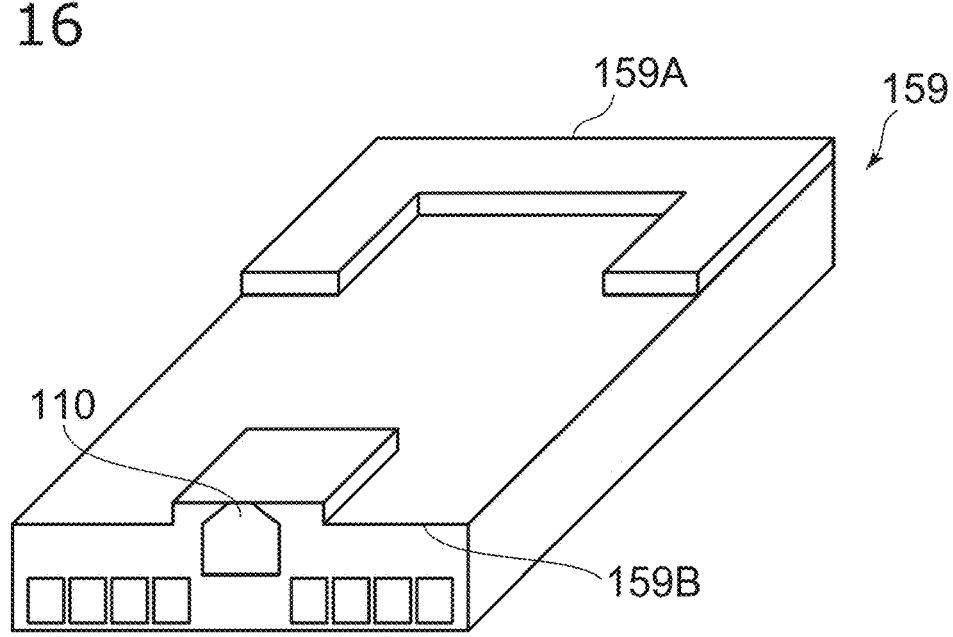
FIG. 16 is a schematic perspective view illustrating a part of the magnetic recording device according to the embodiment.

FIG. 16 is a schematic perspective view illustrating a part of the magnetic recording device according to the embodiment.

FIG. 16 illustrates a head slider.

The magnetic head 110 is provided on the head slider 159. The head slider 159 includes, for example, $Al_2O_3/TiC$ or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 17:
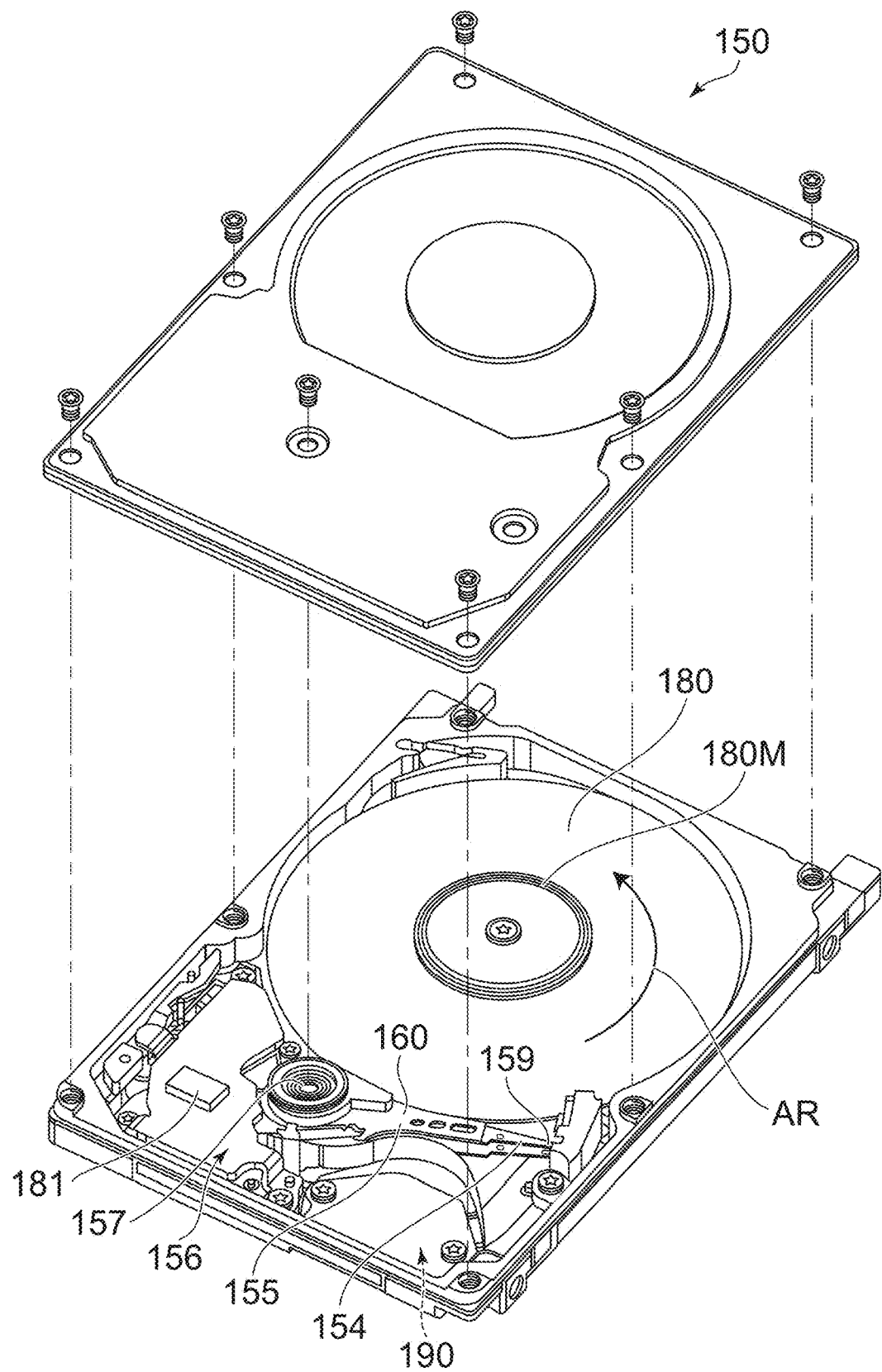
FIG. 17 is a schematic perspective view illustrating the magnetic recording device according to the second embodiment.

FIG. 17 is a schematic perspective view illustrating the magnetic recording device according to the second embodiment.

As shown in FIG. 17, in a magnetic recording device 150 according to the embodiment, a rotary actuator is used. A recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. A magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

Figure 18A:
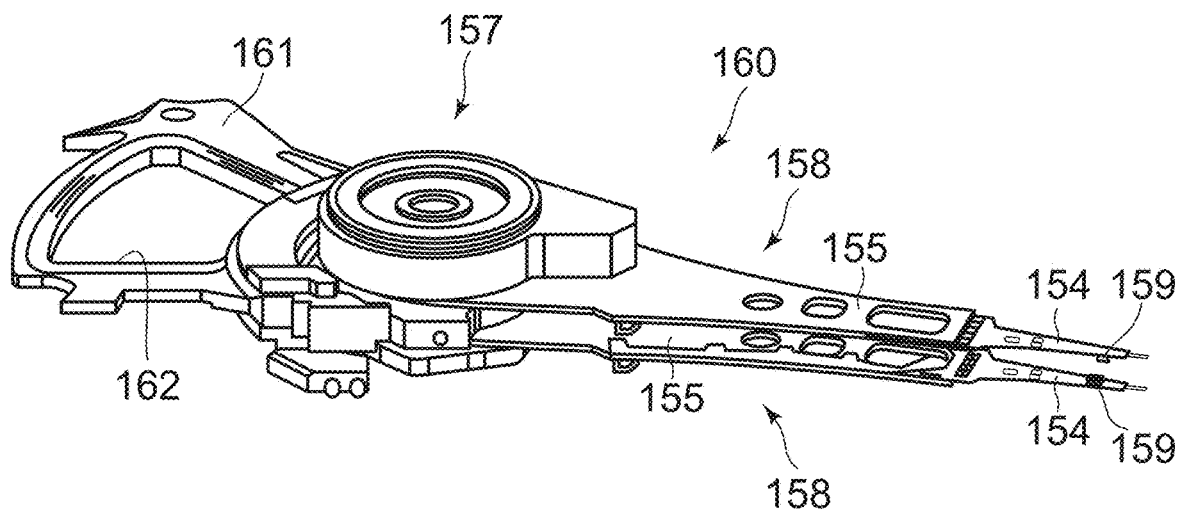
FIGS. 18A and 18B are schematic perspective views illustrating a part of the magnetic recording device according to the second embodiment.
Figure 18B:
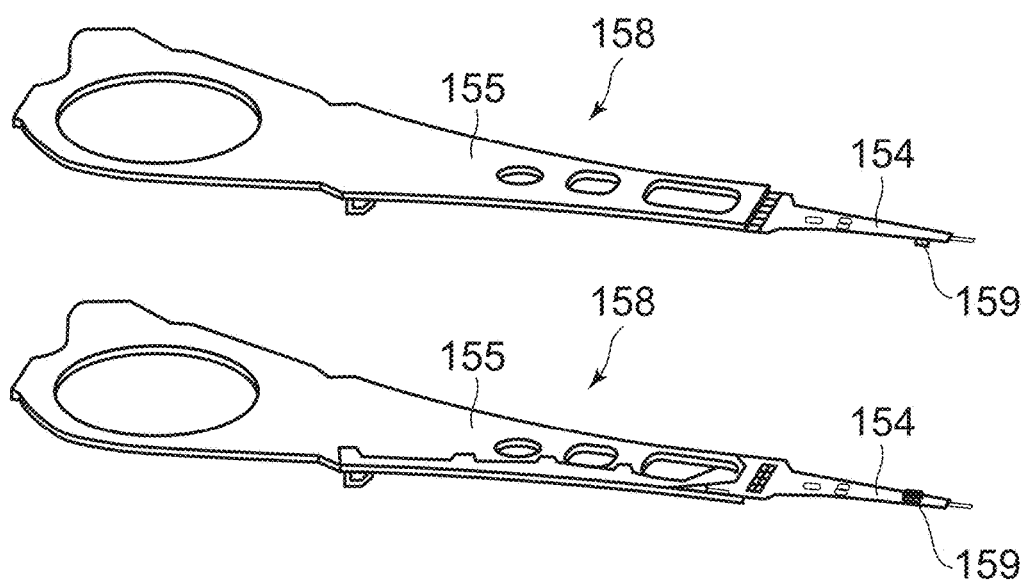

FIGS. 18A and 18B are schematic perspective views illustrating a part of the magnetic recording device according to the second embodiment.

FIG. 18A illustrates a head stack assembly 160 included in the magnetic recording device 150. The head stack assembly 160 includes a magnetic head assembly 158 (e.g., head gimbal assembly: HGA). FIG. 18B illustrates the magnetic head assembly 158.

As shown in FIG. 18A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 18B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following configurations (for example, technical proposals).

Configuration 1

A magnetic head comprising:

a first magnetic pole;

a second magnetic pole;

a conductive part electrically insulated from the first magnetic pole and the second magnetic pole;

a first terminal and a second terminal electrically connected to the conductive part;

an element part provided between the first magnetic pole and the second magnetic pole and electrically connected to the first magnetic pole and the second magnetic pole, the element part being conductive;

a third terminal electrically connected to the first magnetic pole; and a fourth terminal electrically connected to the second magnetic pole, a first magnetic pole temperature of the first magnetic pole in a first state being higher than a second magnetic pole temperature of the second magnetic pole in the first state, a first current being supplied between the first terminal and the second terminal in the first state.

Configuration 2
The magnetic head according to Configuration 1, wherein in the first state, a current is not supplied between the third terminal and the fourth terminal.

Configuration 3
The magnetic head according to Configuration 1 or 2, wherein
in a first operation, the first current is supplied between the first terminal and the second terminal, and
in the first operation, an element current is supplied between the third terminal and the fourth terminal.

Configuration 4
The magnetic head according to Configuration 3, wherein an orientation of the element current is an orientation from the fourth terminal to the third terminal.

Configuration 5
The magnetic head according to Configuration 3, wherein in the first operation, a magnetic field corresponding to the first current is generated from the first magnetic pole.

Configuration 6
The magnetic head according to Configuration 5, wherein an orientation of the magnetic field is configured to change according to an orientation of the first current.

Configuration 7
The magnetic head according to any one of Configurations 3 to 6, wherein
in the first operation, information corresponding to the orientation of the first current is recorded on a magnetic recording medium.

Configuration 8
The magnetic head according to Configuration 7, wherein
the first magnetic pole includes a first magnetic pole face facing the magnetic recording medium,
the second magnetic pole includes a second magnetic pole face facing the magnetic recording medium, and
the first magnetic pole face is smaller than the second magnetic pole face.

Configuration 9
The magnetic head according to any one of Configurations 1 to 8, wherein
in the first state, a first potential of the first magnetic pole is higher than a second potential of the second magnetic pole.

Configuration 10
A magnetic head comprising:
a first magnetic pole;
a second magnetic pole;
a conductive part electrically insulated from the first magnetic pole and the second magnetic pole;
a first terminal and a second terminal electrically connected to the conductive part;
an element part provided between the first magnetic pole and the second magnetic pole and electrically connected to the first magnetic pole and the second magnetic pole, the element part being conductive;
a third terminal electrically connected to the first magnetic pole; and
a fourth terminal electrically connected to the second magnetic pole,
a first potential of the first magnetic pole in a first state being higher than a second potential of the second magnetic pole in the first state, a first current being supplied between the first terminal and the second terminal in the first state, and
a current being not supplied between the third terminal and the fourth terminal in the first state.

Configuration 11
The magnetic head according to any one of Configurations 1 to 10, wherein
the second magnetic pole further includes a first region,
the element part includes a first region element, and
the first region element is provided between the first magnetic pole and the first region.

Configuration 12
The magnetic head according to Configuration 11, wherein
the second magnetic pole further includes a second region,
the first magnetic pole is between the second region and the first region,
the element part further includes a second region element, and
the second region element is provided between the second region and the first magnetic pole.

Configuration 13
The magnetic head according to Configuration 11 or 12, wherein
the second magnetic pole further includes a third region,
a second direction from the third region to the first magnetic pole crosses a first direction from the first magnetic pole to the first region,
the element part further includes a third region element, and
the third region element is provided between the third region and the first magnetic pole.

Configuration 14
The magnetic head according to Configuration 13, wherein
the second magnetic pole further includes a fourth region,
the first magnetic pole is between the third region and the fourth region in the second direction,
the element part further includes a fourth region element, and
the fourth region element is provided between the first magnetic pole and the fourth region.

Configuration 15
The magnetic head according to any one of Configurations 1 to 14, wherein
the element part includes a first magnetic pole side non-magnetic layer contacting the first magnetic pole, and
the first magnetic pole side non-magnetic layer includes at least one selected from the group consisting of Ru, Ta, Ir, Rh, Pd, Pt and W.

Configuration 16
The magnetic head according to Configuration 15, wherein
the element part further includes a first stacked body,
the first magnetic pole side non-magnetic layer is between the first magnetic pole and the first stacked body,
the first stacked body includes a first magnetic layer and a first non-magnetic layer, and
the first magnetic layer is between the first magnetic pole side non-magnetic layer and the first non-magnetic layer.

Configuration 17

The magnetic head according to any one of Configurations 1 to 14, wherein
the element part includes
a first magnetic pole side magnetic layer, and
a non-magnetic intermediate layer,
the first magnetic pole side magnetic layer is provided between the first magnetic pole and the non-magnetic intermediate layer,
the non-magnetic intermediate layer includes at least one selected from the group consisting of Cu, Au, Cr, V, Al and Ag, and
the first magnetic pole side magnetic layer includes
at least one selected from the group consisting of Fe, Co, and Ni, and
at least one selected from the group consisting of Cr, V, Mn, Ti, and Sc.

Configuration 18

The magnetic head according to Configuration 17, wherein
the first magnetic pole side magnetic layer contacts the non-magnetic intermediate layer.

Configuration 19

The magnetic head according to Configuration 17 or 18, wherein
the element part further includes a first stacked body, and
the non-magnetic intermediate layer is between the first magnetic pole side magnetic layer and the first non-magnetic layer.

Configuration 20

A magnetic recording device, comprising:
the magnetic head according to any one of Configurations 3 to 6;
a first circuit configured to supply the first current; and
a second circuit configured to supply the element current.

According to the embodiments, it is possible to provide a magnetic head and a magnetic recording device capable of improving characteristics.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles, elements, conductive parts, magnetic layers, non-magnetic layers, terminals, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head comprising:
a first magnetic pole;
a second magnetic pole;
a conductive part electrically insulated from the first magnetic pole and the second magnetic pole;
a first terminal and a second terminal electrically connected to the conductive part;
an element part provided between the first magnetic pole and the second magnetic pole and electrically connected to the first magnetic pole and the second magnetic pole, the element part being conductive;
a third terminal electrically connected to the first magnetic pole; and
a fourth terminal electrically connected to the second magnetic pole,
a first magnetic pole temperature of the first magnetic pole in a first state being higher than a second magnetic pole temperature of the second magnetic pole in the first state, a first current being supplied between the first terminal and the second terminal in the first state,
wherein
the element part includes
a first magnetic pole side magnetic layer, and
a non-magnetic intermediate layer,
the first magnetic pole side magnetic layer is provided between the first magnetic pole and the non-magnetic intermediate layer,
the non-magnetic intermediate layer includes at least one selected from the group consisting of Cu, Au, Cr, V, Al and Ag, and
the first magnetic pole side magnetic layer includes
at least one selected from the group consisting of Fe, Co, and Ni, and
at least one selected from the group consisting of Cr, V, Mn, Ti, and Sc, and
the first magnetic pole side magnetic layer physically contacts the first magnetic pole and the non-magnetic intermediate layer,
the element part further includes a first stacked body,
the non-magnetic intermediate layer is between the first magnetic pole side magnetic layer and the first stacked body,
the first stacked body includes:
a first magnetic layer provided between the non-magnetic intermediate layer and the second magnetic pole,
a second magnetic layer provided between the first magnetic layer and the second magnetic pole,
a third magnetic layer provided between the second magnetic layer and the second magnetic pole,
a first non-magnetic layer provided between the first magnetic layer and the second magnetic layer, a second non-magnetic layer provided between the second magnetic layer and the third magnetic layer, and a third non-magnetic layer provided between the third magnetic layer and the second magnetic pole.

2. The head according to claim 1, wherein
in the first state, a current is not supplied between the third terminal and the fourth terminal.

3. The head according to claim 2, wherein
in a first operation, the first current is supplied between the first terminal and the second terminal, and
in the first operation, an element current is supplied between the third terminal and the fourth terminal.

4. The head according to claim 3, wherein
an orientation of the element current is an orientation from the fourth terminal to the third terminal.

5. The head according to claim 3, wherein
in the first operation, a magnetic field corresponding to the first current is generated from the first magnetic pole.

6. The head according to claim 5, wherein
an orientation of the magnetic field is configured to change according to an orientation of the first current.

7. The head according to claim 3, wherein
in the first operation, information corresponding to an orientation of the first current is recorded on a magnetic recording medium.

8. The head according to claim 7, wherein
the first magnetic pole includes a first magnetic pole face facing the magnetic recording medium,
the second magnetic pole includes a second magnetic pole face facing the magnetic recording medium, and
the first magnetic pole face is smaller than the second magnetic pole face.

9. A magnetic recording device, comprising:
the magnetic head according to claim 3;
a first circuit configured to supply the first current; and
a second circuit configured to supply the element current.

10. The head according to claim 1, wherein
in the first state, a first potential of the first magnetic pole is higher than a second potential of the second magnetic pole.

11. The head according to claim 1, wherein
the second magnetic pole further includes a first region,
the element part includes a first region element, and
the first region element is provided between the first magnetic pole and the first region.

12. The head according to claim 11, wherein
the second magnetic pole further includes a second region,
the first magnetic pole is between the second region and the first region,
the element part further includes a second region element, and
the second region element is provided between the second region and the first magnetic pole.

13. The head according to claim 11, wherein
the second magnetic pole further includes a third region,
a second direction from the third region to the first magnetic pole crosses a first direction from the first magnetic pole to the first region,
the element part further includes a third region element, and
the third region element is provided between the third region and the first magnetic pole.

14. The head according to claim 13, wherein
the second magnetic pole further includes a fourth region,
the first magnetic pole is between the third region and the fourth region in the second direction,
the element part further includes a fourth region element, and
the fourth region element is provided between the first magnetic pole and the fourth region.

15. The head according to claim 1, wherein
the second non-magnetic layer includes at least one selected from the group consisting of Cu, Au, Cr, V, Al, and Ag.

16. The head according to claim 1, wherein
the first non-magnetic layer includes at least one selected from the group consisting of Cu, Au, Cr, V, Al, and Ag.

17. The head according to claim 16, wherein
the first stacked body further includes
a fourth magnetic layer provided between the third non-magnetic layer and the second magnetic pole, and
a fourth non-magnetic layer provided between the fourth magnetic layer and the second magnetic pole.

18. A magnetic head comprising:
a first magnetic pole;
a second magnetic pole;
a conductive part electrically insulated from the first magnetic pole and the second magnetic pole;
a first terminal and a second terminal electrically connected to the conductive part;
an element part provided between the first magnetic pole and the second magnetic pole and electrically connected to the first magnetic pole and the second magnetic pole, the element part being conductive;
a third terminal electrically connected to the first magnetic pole; and
a fourth terminal electrically connected to the second magnetic pole,
a first potential of the first magnetic pole in a first state being higher than a second potential of the second magnetic pole in the first state, a first current being supplied between the first terminal and the second terminal in the first state, and
a current being not supplied between the third terminal and the fourth terminal in the first state,
wherein
the element part includes
a first magnetic pole side magnetic layer, and
a non-magnetic intermediate layer,
the first magnetic pole side magnetic layer is provided between the first magnetic pole and the non-magnetic intermediate layer,
the non-magnetic intermediate layer includes at least one selected from the group consisting of Cu, Au, Cr, V, Al and Ag, and
the first magnetic pole side magnetic layer includes
at least one selected from the group consisting of Fe, Co, and Ni, and
at least one selected from the group consisting of Cr, V, Mn, Ti, and Sc,
the first magnetic pole side magnetic layer physically contacts the first magnetic pole and the non-magnetic intermediate layer,
the element part further includes a first stacked body,
the non-magnetic intermediate layer is between the first magnetic pole side magnetic layer and the first stacked body, the first stacked body includes:
- a first magnetic layer provided between the non-magnetic intermediate layer and the second magnetic pole,
- a second magnetic layer provided between the first magnetic layer and the second magnetic pole,
- a third magnetic layer provided between the second magnetic layer and the second magnetic pole,
- a first non-magnetic layer provided between the first magnetic layer and the second magnetic layer,
- a second non-magnetic layer provided between the second magnetic layer and the third magnetic layer, and
- a third non-magnetic layer provided between the third magnetic layer and the second magnetic pole.

19. The head according to claim 18, wherein
the second non-magnetic layer includes at least one selected from the group consisting of Cu, Au, Cr, V, Al, and Ag.

20. The head according to claim 18, wherein
the first non-magnetic layer includes at least one selected from the group consisting of Cu, Au, Cr, V, Al, and Ag.

21. The head according to claim 20, wherein
the first stacked body further includes
a fourth magnetic layer provided between the third non-magnetic layer and the second magnetic pole, and
a fourth non-magnetic layer provided between the fourth magnetic layer and the second magnetic pole.

* * * * *